US008869300B2

(12) United States Patent
Singh et al.

(10) Patent No.: US 8,869,300 B2
(45) Date of Patent: Oct. 21, 2014

(54) REDIRECTION OF INFORMATION FROM SECURE VIRTUAL MACHINES TO UNSECURE VIRTUAL MACHINES

(75) Inventors: Manbinder Pal Singh, Karnataka (IN); Imtiaz Mohammad, Karnataka (IN); Ian Pratt, Cambridge (GB)

(73) Assignee: Citrix Sytems, Inc., Fort Lauderdale, FL (US)

( * ) Notice: Subject to any disclaimer, the term of this patent is extended or adjusted under 35 U.S.C. 154(b) by 0 days.

(21) Appl. No.: 13/103,350

(22) Filed: May 9, 2011

(65) Prior Publication Data

US 2012/0054744 A1    Mar. 1, 2012

Related U.S. Application Data

(60) Provisional application No. 61/333,205, filed on May 10, 2010.

(51) Int. Cl.
| | | |
|---|---|---|
| *G06F 12/00* | (2006.01) | |
| *G06F 7/04* | (2006.01) | |
| *G06F 12/14* | (2006.01) | |
| *G06F 13/00* | (2006.01) | |
| *G06F 17/30* | (2006.01) | |
| *G06F 7/00* | (2006.01) | |
| *G06F 7/16* | (2006.01) | |
| *G06F 9/455* | (2006.01) | |
| *G06F 15/173* | (2006.01) | |
| *G06F 15/16* | (2006.01) | |
| *G06F 21/53* | (2013.01) | |

(52) U.S. Cl.
CPC .................................... *G06F 21/53* (2013.01)
USPC ................. 726/27; 726/21; 726/30; 709/225; 709/229; 718/1

(58) Field of Classification Search
None
See application file for complete search history.

(56) References Cited

U.S. PATENT DOCUMENTS 7,539,987 B1* 5/2009 Dey et al. .......................... 718/1
(Continued)

FOREIGN PATENT DOCUMENTS

WO   WO-2006/012197   2/2006

OTHER PUBLICATIONS

Stewart et. al, Stream Control Transmission Protocol, Oct. 2000, The Internet Society, pp. 1, 2, 9, and 18.*
International Preliminary Report on Patentability on PCT/US2011/035735 dated Nov. 22, 2012.

(Continued)

*Primary Examiner* — Lewis A Bullock, Jr.
*Assistant Examiner* — Melissa Alfred
(74) *Attorney, Agent, or Firm* — Foley and Lardner LLP; John D. Lanza

(57) ABSTRACT

The present invention is directed towards methods and systems for redirecting an access request to an unsecure virtual machine. A computing device may execute a hypervisor hosting a secure virtual machine and an unsecure virtual machine. A control virtual machine, hosted by a hypervisor executing on the computing device, may intercept a request to access an unsecure resource. The unsecure resource may include one of: a file, an application and an uniform resource locator (URL). The control virtual machine may further determine that the request originates from a secure virtual machine executing on the computing device. The control virtual machine may redirect, responsive to the determination, the request to an unsecure virtual machine executing on the computing device, whereupon the unsecure virtual machine may provide access to the requested unsecure resource.

21 Claims, 9 Drawing Sheets

(56) References Cited

U.S. PATENT DOCUMENTS

| | | |
|---|---|---|
| 2002/0066021 A1 | 5/2002 | Chien et al. |
| 2005/0268095 A1* | 12/2005 | O'Connor ............... 713/167 |
| 2008/0127292 A1 | 5/2008 | Cooper et al. |
| 2009/0125902 A1* | 5/2009 | Ghosh et al. ............... 718/1 |
| 2009/0125974 A1 | 5/2009 | Zhang et al. |

OTHER PUBLICATIONS

International Search Report on PCT/US2011/035735 dated Jan. 9, 2012.
Written Opinion on PCT/US2011/035735 dated Jan. 9, 2012.
Extended European Search Report on 11781076.2 dated May 30, 2014.

\* cited by examiner

REDIRECTION OF INFORMATION FROM SECURE VIRTUAL MACHINES TO UNSECURE VIRTUAL MACHINES

RELATED APPLICATIONS

This present application claims the benefit of and priority to: U.S. Provisional Patent Application No. 61/333,205 entitled "Redirection of Information from Secure Virtual Machines to Unsecure Virtual Machines," filed May 10, 2010, which is incorporated by reference in its entirety.

FIELD OF THE DISCLOSURE

The methods and systems described herein relate generally to transmitting information between virtual machines. In particular, the methods and systems relate to redirecting information from a secure virtual machine to an unsecure virtual machine.

BACKGROUND OF THE DISCLOSURE

As the number of mobile employees, remote employees, guests and task-based employees increases, so does the need for computing systems that restrict the information available to each type of employee, and isolate an employee's personal data from work-related data. Many companies provide their employees with laptops, remote access to the company's intranet, remote access to applications used by an employee, remote access to an employee's files, and access to remote desktops, virtual machines, or remote applications. In many instances, employees can access company resources from any geographical location, using any machine and/or network.

Some companies may provide their employees with machines that can be used to access company resources. In some instances, these machines can execute one or more hypervisors that can manage virtual machines dedicated to executing company applications and accessing company resources. Often employees perform personal tasks and access personal information from corporate applications. In these instances, a company may wish to limit the amount of exposure personal information has to corporate documents, information and applications. A user may be restricted from accessing personal resources while logged into a work-issued virtual machine or virtual desktop. Access to personal information, URLs and applications may be restricted to access from an unsecure or personal domain.

BRIEF SUMMARY OF THE DISCLOSURE

Described herein are methods and systems for redirecting requests to execute an application, requests to access a file and requests to navigate to a website identified in a URL, to either a secure or unsecure virtual machine. In some embodiments, the methods and systems can include intercepting such a request and identifying an application, folder, file, domain or other resource designated as either secure or unsecure. When the request originates from a secure virtual machine and the requested file, application or URL is unsecure, the request can be redirected to an unsecure virtual machine. When the request originates from an unsecure virtual machine and the requested file, application or URL is secure, the request can be redirected to a secure virtual machine. Upon redirecting the request to the appropriate virtual machine, the request is satisfied by that virtual machine.

In one aspect, the present invention is related to a method for redirecting an access request to an unsecure virtual machine. The method can apply to a computing device that executes a hypervisor hosting a secure virtual machine and an unsecure virtual machine. The method may include intercepting, by a control virtual machine hosted by a hypervisor executing on a computing device, a request to access an unsecure resource, the unsecure resource comprising one of: a file, an application and an uniform resource locator (URL). The control virtual machine may determine that the request originates from a secure virtual machine executing on the computing device. The control virtual machine may redirect, responsive to the determination, the request to an unsecure virtual machine executing on the computing device. The unsecure virtual machine may provide access to the requested unsecure resource.

In some embodiments, a control program of the control virtual machine intercepts the request. The control program may execute on a processor of the computing device. A control virtual machine hosted by a type 1 hypervisor executing on the computing device may intercept the request. An application executing on the secure virtual machine may initiate the request for the unsecure resource. The control virtual machine may determine whether a virtual machine is secure based on one of: an application executing on the virtual machine, an identity of a user accessing the virtual machine, a level of access granted to the virtual machine for accessing one or more resources, and a risk level assigned to the virtual machine. In some embodiments, the control virtual machine may determine whether a requested resource is secure based on one of: file-type association between a requested file and an application, a configuration file of resources, a security setting of the requested resource, an identity of a website corresponding to the requested resource, an identity of a location corresponding to the requested resource, and an identity of a host corresponding to the requested resource.

In some embodiments, the control virtual machine redirects one of: a cookie and a security token with the request. The requested resource may be accessed by one of: downloading a requested file to the unsecure virtual machine, opening a requested file on the unsecure virtual machine, executing a requested application on the unsecure virtual machine, and navigating to a website identified by a requested URL from the unsecure virtual machine. In certain embodiments, the requested resource is displayed on the secure virtual machine via a window executing on the unsecure virtual machine. In some other embodiments, the requested resource is displayed on the unsecure virtual machine.

In another aspect, the present disclosure is related to a system for redirecting an access request to an unsecure virtual machine. The system can include a computing device that comprises a hypervisor hosting a control virtual machine, a secure virtual machine and an unsecure virtual machine. The control virtual machine may be configured to intercept a request for access to an unsecure resource, the unsecure resource comprising one of: a file, an application and an uniform resource locator (URL). The control virtual machine may determine if the request originates from the secure virtual machine. The control virtual machine may further redirect, responsive to a determination that the request originates from the secure virtual machine, the request to the unsecure virtual machine executing on the computing device. In response to the redirection, the unsecure virtual machine provides access to the requested unsecure resource.

In some embodiments, the control virtual machine includes a control program for intercepting the request. The control program may execute on a processor of the computing device. The hypervisor may include a type 1 hypervisor. The system may further include an application executing on the secure virtual machine, initiating the request for the unsecure resource. The control virtual machine may determine if a virtual machine is secure or unsecure based on one of: an application executing on the virtual machine, an identity of a user accessing the virtual machine, a level of access granted to the virtual machine for accessing one or more resources, and a risk level assigned to the virtual machine. The control virtual machine may determine if a requested resource is secure or unsecure based on one of: file-type association between a requested file and an application, a configuration file of resources, a security setting of the requested resource, an identity of a website corresponding to the requested resource, an identity of a location corresponding to the requested resource, and an identity of a host corresponding to the requested resource.

In some embodiments, the control program further redirects one of: a cookie and a security token with the request. The requested resource may be accessed by one of: downloading a requested file to the unsecure virtual machine, opening a requested file on the unsecure virtual machine, executing a requested application on the unsecure virtual machine, and navigating to a website identified by a requested URL from the unsecure virtual machine. In some embodiments, the control program is further configured to display the requested resource on the secure virtual machine via a window executing on the unsecure virtual machine.

In yet another aspect, the present disclosure is related to a method for redirecting an access request to a secure virtual machine. The method can apply to a computing device that executes a hypervisor hosting a secure virtual machine and an unsecure virtual machine. The method may include intercepting, by a control virtual machine hosted by a hypervisor executing on a computing device, a request to access a secure resource. The secure resource may include one of: a file, an application and an uniform resource locator (URL). The control virtual machine may determine that the request originates from a unsecure virtual machine executing on the computing device. The control virtual machine may further redirect the request to an secure virtual machine executing on the computing device responsive to the determination. The secure virtual machine may provide access to the requested unsecure resource.

The details of various embodiments of the invention are set forth in the accompanying drawings and the description below.

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1A:
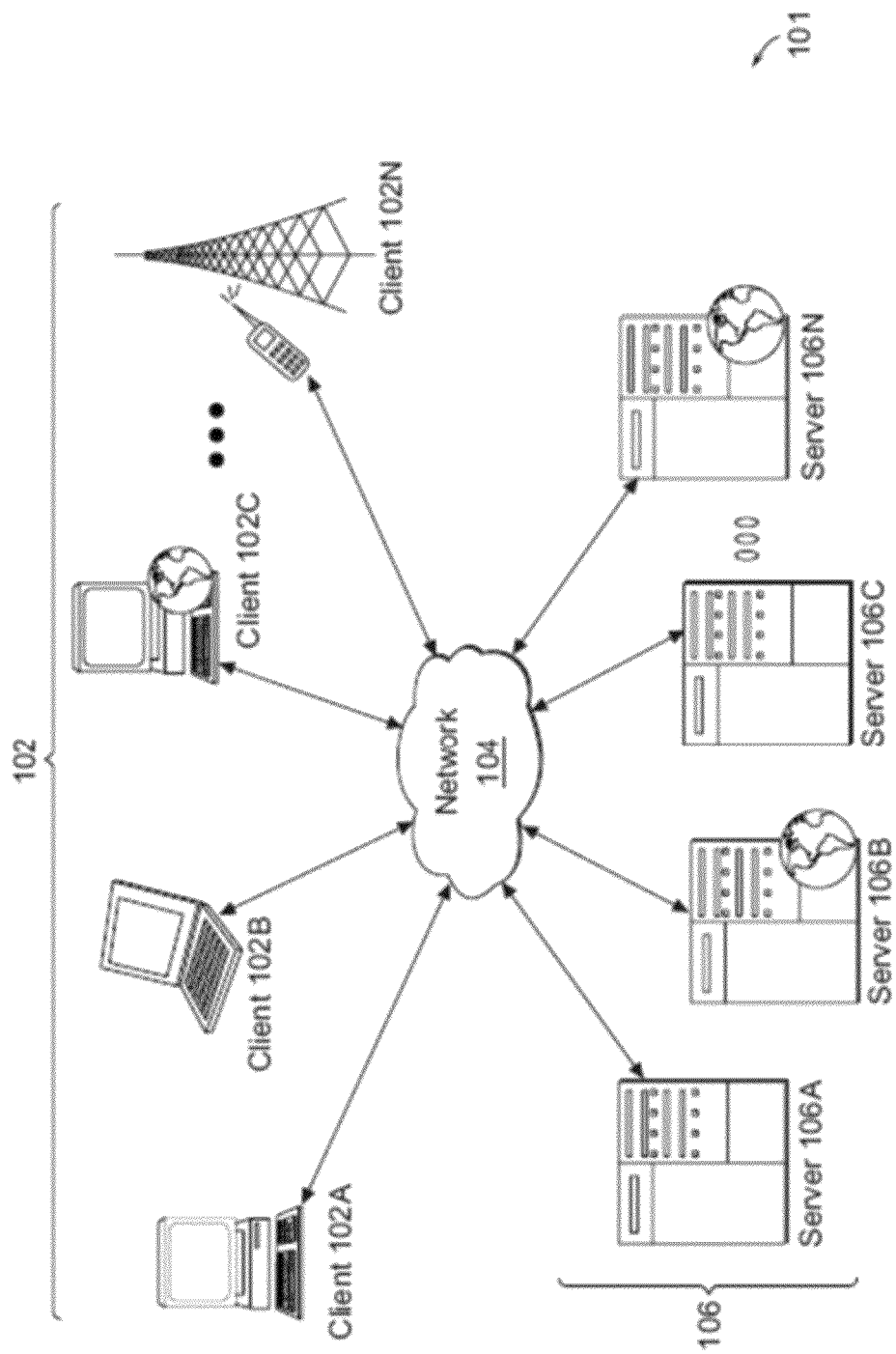
FIG. 1A is a block diagram depicting an embodiment of a network environment comprising local machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems including a virtualization environment which may be useful for practicing embodiments described herein; and Section C describes embodiments of systems and for redirecting access requests between secure and unsecure virtual machines.

A. Network and Computing Environment

Referring now to FIG. 1A, an embodiment of a network environment is depicted. In brief overview, the network environment comprises one or more local machines 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a local machine 102 has the capacity to function as both a client node seeking access to resources provided by a server and as a server providing access to hosted resources for other clients 102a-102n.

Although FIG. 1A shows a network 104 between the local machines 102 and the remote machines 106, the local machines 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the local machines 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks. In yet another embodiment, networks 104 and 104' may both be public networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm. In another of these embodiments, the remote machines 106 may be geographically dispersed. In other embodiments, a server farm may be administered as a single entity. In still other embodiments, the server farm comprises a plurality of server farms. The remote machines 106 within each server farm can be heterogeneous—one or more of the remote machines 106 can operate according to one type of operating system platform (e.g., WINDOWS NT, WINDOWS 2003, WINDOWS 2008, WINDOWS 7 and WINDOWS Server 2008 R2, all of which are manufactured by Microsoft Corp. of Redmond, Wash.), while one or more of the other remote machines 106 can operate on according to another type of operating system platform (e.g., Unix or Linux).

The remote machines 106 of each server farm do not need to be physically proximate to another remote machine 106 in the same server farm. Thus, the group of remote machines 106 logically grouped as a server farm may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm can be increased if the remote machines 106 are connected using a local-area network (LAN) connection or some form of direct connection.

A remote machine 106 may be a file server, application server, web server, proxy server, appliance, network appliance, gateway, application gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

In one embodiment, a remote machine 106 may include an Active Directory. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 executes an application on behalf of a user of a local machine 102. In other embodiments, a remote machine 106 executes a virtual machine, which provides an execution session within which applications execute on behalf of a user of a local machine 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a local machine 102 communicates with a remote machine 106. In one embodiment, the local machine 102 communicates directly with one of the remote machines 106 in a server farm 38. In another embodiment, the local machine 102 executes a program neighborhood application to communicate with a remote machine 106 in a server farm 38. In still another embodiment, the remote machine 106 provides the functionality of a master node. In some embodiments, the local machine 102 communicates with the remote machine 106 in the server farm 38 through a network 104. Over the network 104, the local machine 102 can, for example, request execution of various applications hosted by the remote machines 106a-106n in the server farm 38 and receive output of the results of the application execution for display. In some embodiments, only a master node provides the functionality required to identify and provide address information associated with a remote machine 106b hosting a requested application.

In one embodiment, the remote machine 106 provides the functionality of a web server. In another embodiment, the remote machine 106a receives requests from the local machine 102, forwards the requests to a second remote machine 106b and responds to the request by the local machine 102 with a response to the request from the remote machine 106b. In still another embodiment, the remote machine 106a acquires an enumeration of applications available to the local machine 102 and address information associated with a remote machine 106b hosting an application identified by the enumeration of applications. In yet another embodiment, the remote machine 106 presents the response to the request to the local machine 102 using a web interface. In one embodiment, the local machine 102 communicates directly with the remote machine 106 to access the identified application. In another embodiment, the local machine 102 receives output data, such as display data, generated by an execution of the identified application on the remote machine 106.

In some embodiments, the remote machine 106 or a server farm 38 may be running one or more applications, such as an application providing a thin-client computing or remote display presentation application. In one embodiment, the remote machine 106 or server farm 38 executes as an application any portion of the CITRIX ACCESS SUITE by Citrix Systems, Inc., such as the METAFRAME or CITRIX PRESENTATION SERVER products, any of the following products manufactured by Citrix Systems, Inc.: CITRIX XENAPP, CITRIX XENDESKTOP, CITRIX ACCESS GATEWAY, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the remote machine 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A local machine 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on local machine 102. In some embodiments, the application may be a server-based or a remote-based application executed on behalf of the local machine 102 on a remote machine 106. In other embodiments, the remote machine 106 may display output to the local machine 102 using any thin-client protocol, presentation layer protocol, or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In still other embodiments, the application comprises any type of software related to voice over Internet protocol (VoIP) communications, such as a soft IP telephone. In further embodiments, the application comprises any application related to real-time data communications, such as applications for streaming video and/or audio.

Figure 1B:
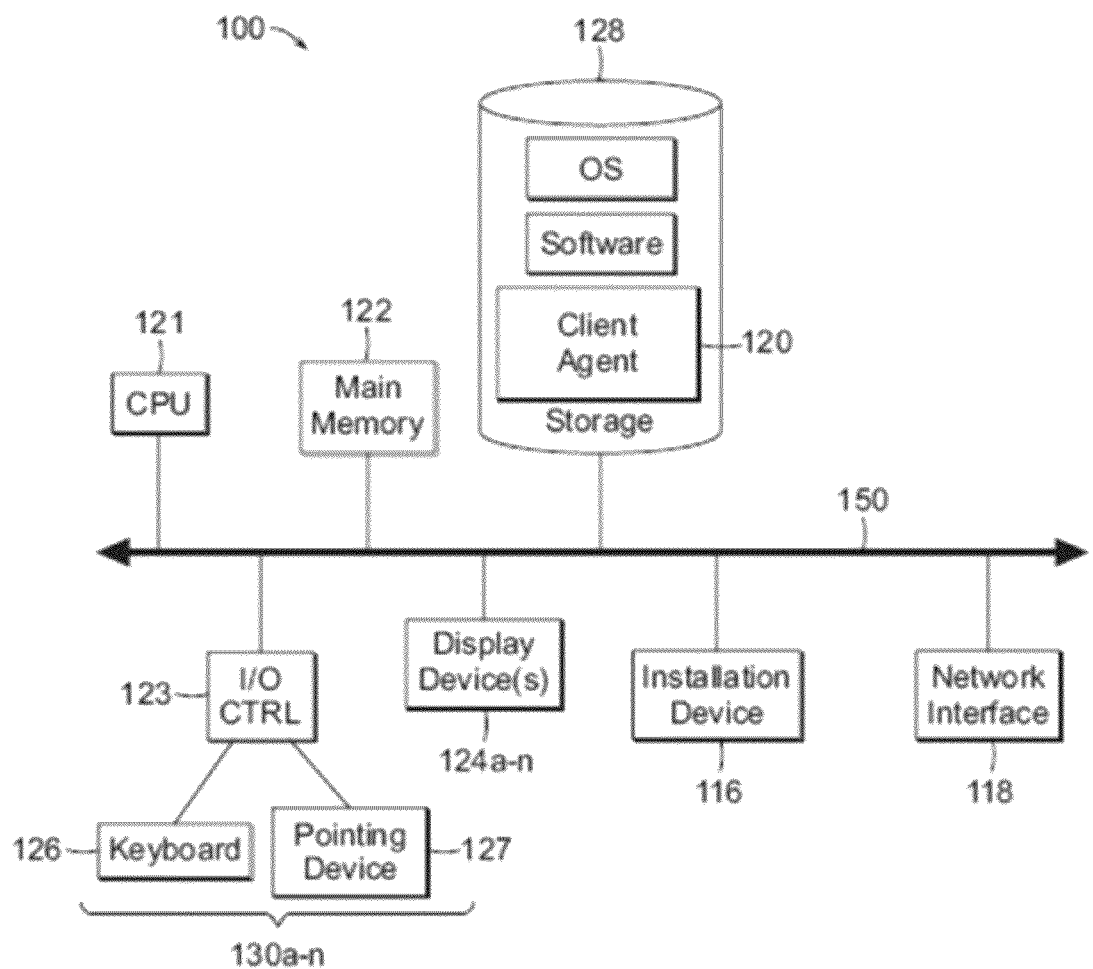
FIGS. 1B-1C are block diagrams depicting embodiments of computers useful in connection with the methods and systems described herein.
Figure 1C:
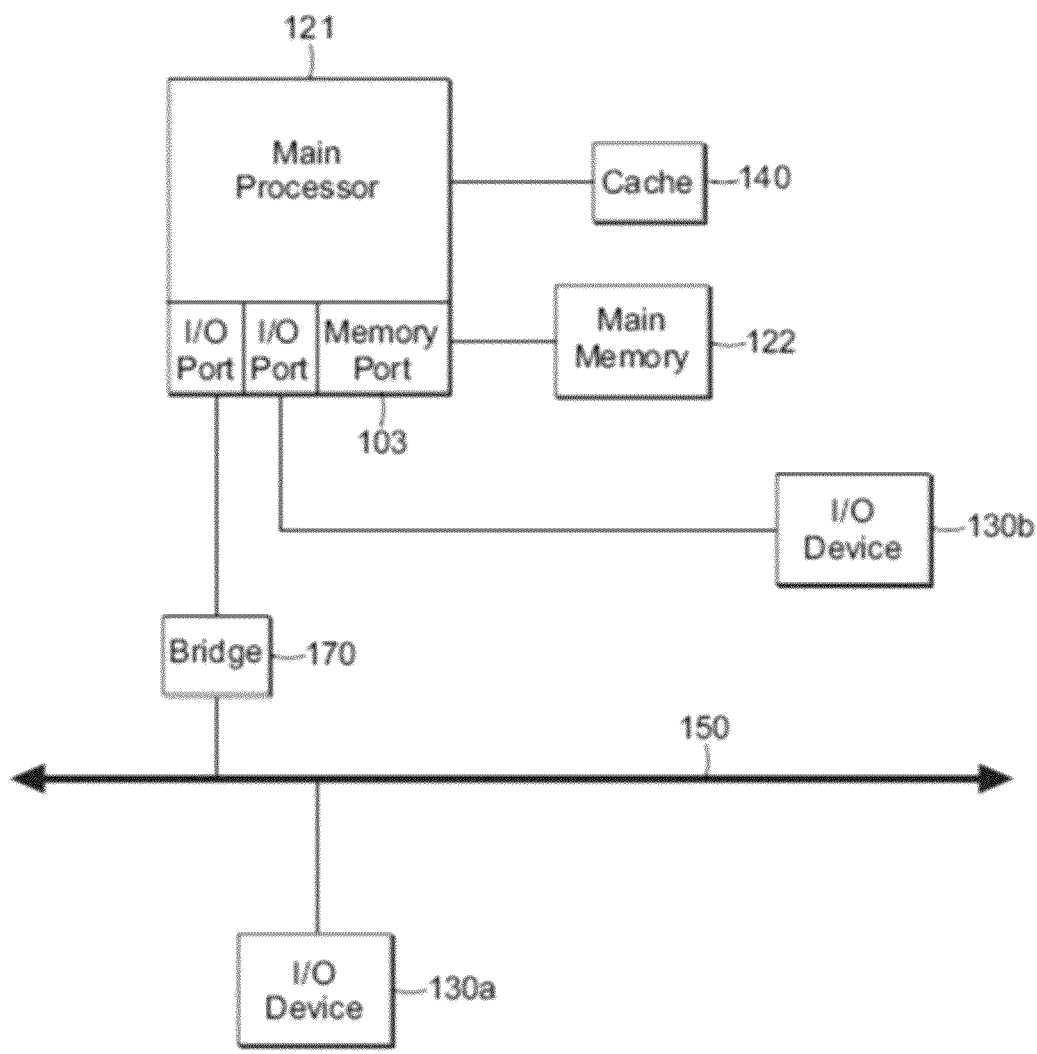

The local machine 102 and remote machine 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the local machine 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. An I/O controller 123, as shown in FIG. 1B, may control the I/O devices. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS 7, WINDOWS CE, WINDOWS XP, and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing device 100 may comprise a device of the IPOD family of devices manufactured by Apple Inc., of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, i335, i365, i570, 1576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is a device in the iPhone line of smartphones, manufactured by Apple Inc., of Cupertino, Calif.

In one embodiment, a computing device 102a may request resources from a remote machine 106, while providing the functionality of a remote machine 106 to a client 102b. In such an embodiment, the computing device 102a may be referred to as a client with respect to data received from the remote machine 106 (which may be referred to as a server) and the computing device 102a may be referred to as a server with respect to the second client 102b. In another embodiment, the client 102 may request resources from the remote machine 106 on behalf of a user of the client 102.

As shown in FIG. 1D, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

In some embodiments, the computing device 100 may comprise a graphics processing unit. In one of these embodiments, depicted in FIG. 1E, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In one embodiment, a resource may be a program, an application, a document, a file, a plurality of applications, a plurality of files, an executable program file, a desktop environment, a computing environment, or other resource made available to a user of the local computing device 102. The resource may be delivered to the local computing device 102 via a plurality of access methods including, but not limited to, conventional installation directly on the local computing device 102, delivery to the local computing device 102 via a method for application streaming, delivery to the local computing device 102 of output data generated by an execution of the resource on a third computing device 106*b* and communicated to the local computing device 102 via a presentation layer protocol, delivery to the local computing device 102 of output data generated by an execution of the resource via a virtual machine executing on a remote computing device 106, or execution from a removable storage device connected to the local computing device 102, such as a USB device, or via a virtual machine executing on the local computing device 102 and generating output data. In some embodiments, the local computing device 102 transmits output data generated by the execution of the resource to another client computing device 102*b*.

In some embodiments, a user of a local computing device 102 connects to a remote computing device 106 and views a display on the local computing device 102 of a local version of a remote desktop environment, comprising a plurality of data objects, generated on the remote computing device 106. In one of these embodiments, at least one resource is provided to the user by the remote computing device 106 (or by a second remote computing device 106*b*) and displayed in the remote desktop environment. However, there may be resources that the user executes on the local computing device 102, either by choice, or due to a policy or technological requirement. In another of these embodiments, the user of the local computing device 102 would prefer an integrated desktop environment providing access to all of the resources available to the user, instead of separate desktop environments for resources provided by separate machines. For example, a user may find navigating between multiple graphical displays confusing and difficult to use productively. Or, a user may wish to use the data generated by one application provided by one machine in conjunction with another resource provided by a different machine. In still another of these embodiments, requests for execution of a resource, windowing moves, application minimize/maximize, resizing windows, and termination of executing resources may be controlled by interacting with a remote desktop environment that integrates the display of the remote resources and of the local resources. In yet another of these embodiments, an application or other resource accessible via an integrated desktop environment— including those resources executed on the local computing device 102 and those executed on the remote computing device 106—is shown in a single desktop environment.

In one embodiment, data objects from a remote computing device 106 are integrated into a desktop environment generated by the local computing device 102. In another embodiment, the remote computing device 106 maintains the integrated desktop. In still another embodiment, the local computing device 102 maintains the integrated desktop.

In some embodiments, a single remote desktop environment 204 is displayed. In one of these embodiments, the remote desktop environment 204 is displayed as a full-screen desktop. In other embodiments, a plurality of remote desktop environments 204 is displayed. In one of these embodiments, one or more of the remote desktop environments are displayed in non-full-screen mode on one or more display devices 124. In another of these embodiments, the remote desktop environments are displayed in full-screen mode on individual display devices. In still another of these embodiments, one or more of the remote desktop environments are displayed in full-screen mode on one or more display devices 124.

B. Systems Including Virtualization Environments

Figure 2A:
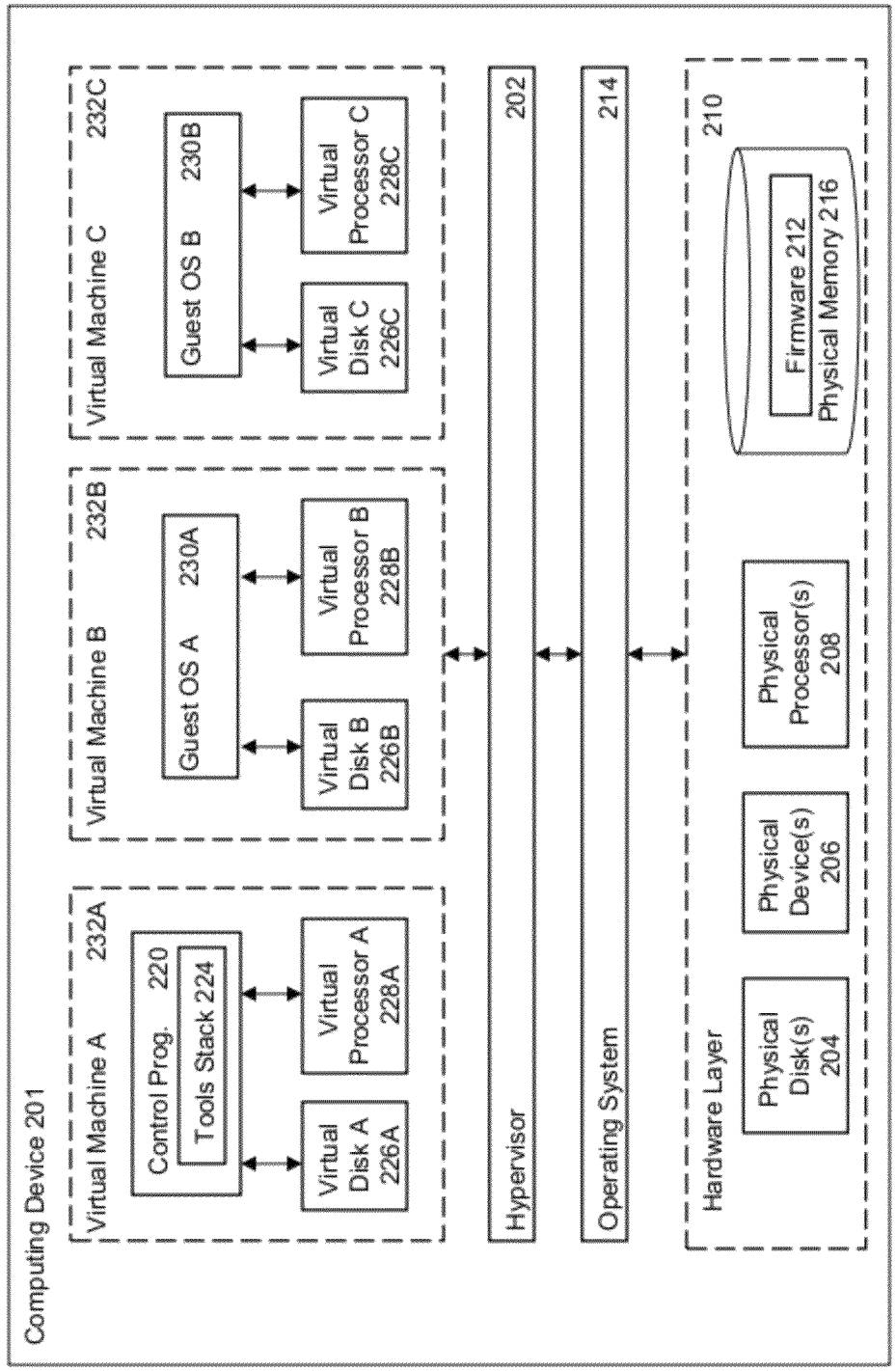
FIGS. 2A and 2B are block diagrams depicting embodiments of a virtualization environment.

Illustrated in FIG. 2A is one embodiment of a virtualization environment. Included on a computing device 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The computing device 201 can further include an operating system 214 that can be stored in a memory element in the physical memory 216 and executed by one or more of the physical processors 208. Still further, a hypervisor 202 can be stored in a memory element in the physical memory 216 and can be executed by one or more of the physical processors 208. Executing on one or more of the physical processors 208 can be one or more virtual machines 232A-C (generally 232). Each virtual machine 232 can have a virtual disk 226A-C and a virtual processor 228A-C. In some embodiments, a first virtual machine 232A can execute, on a virtual processor 228A, a control program 220 that includes a tools stack 224. In other embodiments, one or more virtual machines 232B-C can executed, on a virtual processor 228B-C, a guest operating system 230A-B.

Further referring to FIG. 2A, and in more detail, in one embodiment the virtualization environment described includes a Type 2 hypervisor 202, or a hypervisor that executes within an operating system 214 executing on the computing device 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system.

In some embodiments, the virtualization environment includes a computing device 201. The computing device 201 can be any computing device, and in some embodiments the computing device 201 can be any computer, device or computing machine described herein. While FIG. 2A illustrates a single computing device 201, in some embodiments the modules, programs, virtual machines, and commands stored and executed by the computing device 201 can be executed by more than one computing device 201. In still other embodiments, the computing device 201 can be a server farm.

In one embodiment, the computing device 201 can include a hardware layer 210 that includes one or more pieces of hardware that communicates with the computing machine 201. In some embodiments, the hardware layer 210 can include any hardware included in the computing device 201. In other embodiments, the hardware layer 210 can include one or more physical disks 204, one or more physical devices 206, one or more physical processors 208 and memory 216.

The hardware layer 210, in some embodiments, can include one or more physical disks 204. A physical disk 204 can be any hard disk, while in some embodiments a physical disk 204 can be any hard disk described herein. In some embodiments, the hardware layer 210 can include one physical disk 204. In other embodiments, the hardware layer 210 can include more than one physical disk 204. The computing device 201, in some embodiments, can communicate with an external hard disk that is included in the hardware layer 210 as a physical disk 204.

In other embodiments, the hardware layer 210 can include a processor 208. The processor 208, in some embodiments, can be any processor, while in other embodiments the processor 208 can be any processor described herein. The processor 208 can include one or more processing cores. In other embodiments the computing device 201 can include one or more processors 208. In some embodiments, the computing device 201 can include one or more different processors, e.g. a processing unit, a graphics processing unit, or a physics engine.

Physical devices 206, in some embodiments, can be any device included in the computing device 201. In some embodiments, physical devices 206 can be any combination of devices included in the computing device 201 and external devices that communicate with the computing device 201. The computing device 201, in some embodiments, can include one or more physical devices 206. A physical device 206 can be any of the following: a network interface card; a video card; a keyboard; a mouse; an input device; a monitor; a display device; speakers; an optical drive; a storage device; a universal serial bus connection; any device connected to the computing device 201; any device communicating with the computing device 201; a printer; a scanner; or any other device or device described herein. In various other figures provided herein, a physical device 206 may be shown external to computing device 201, for clarity and without limitation or implication of distinction between internal and external devices.

The hardware layer 210 can further include physical memory 216 that can include any type of memory. In some embodiments, the physical memory 216 can include any memory type described herein. The physical memory 216 can store data, and in some embodiments can store one or more programs, or set of executable instructions. FIG. 2A illustrates one embodiment where firmware 212 is stored within the physical memory 216 of the computing device 201. Programs or executable instructions stored in the physical memory 216 can be executed by the one or more processors 208 of the computing device 201.

Firmware 212, in some embodiments, can be any combination of executable instructions and hardware that controls hardware communicating with or included within the computing device 201. In some embodiments, the firmware 212 can control one or more pieces of hardware within the hardware layer 210. Firmware 212, in many embodiments, can be executed by one or more processors 208 within the computing device 201. In some embodiments, the firmware 212 can be boot firmware such as the basic input/output system (BIOS.) Additional firmware 212 executing on the computing device 201 can interface with the BIOS.

In one embodiment, the computing device 201 can include an operating system 214 executed by one or more physical processors 208. In some embodiments, the operating system 214 is a user operating system that can directly access the hardware devices in the hardware layer 210. The operating system 214 can be any operating system and in some embodiments, the operating system 214 can be any operating system described herein. FIG. 2A illustrates one embodiment where the hypervisor 202 executes within the context of the operating system 214 executing on the computing device 201. In this embodiment, the operating system 214 can be referred to as a host operating system 214, while the other operating systems can be referred to as guest operating systems. Guest operating systems can include the guest operating systems 230A-B executing on the virtual machines 232, and/or the control program 220.

In some embodiments, the computing device 201 can include a hypervisor 202. A hypervisor 202, in some embodiments, can be a program that executed by processors 208 on the computing device 201 to manage any number of virtual machines. The hypervisor 202 can be referred to as a virtual machine monitor, or platform virtualization software. In some embodiments, a hypervisor 202 can be any combination of executable instructions and hardware that monitors virtual machines executing on a computing machine. While FIG. 2A illustrates a virtualization environment that includes a Type 2 hypervisor 202, the computing device 201 can execute any other type of hypervisor. For example, the computing device 201 can execute a virtualization environment that includes a Type 1 hypervisor 202. In some embodiments, the computing device 201 can execute one or more hypervisors 202. These one or more hypervisors 202 can be the same type of hypervisor, or in other embodiments can be different hypervisor types.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices; physical disks; physical processors; physical memory 216 and any other component included in the computing device 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the computing device 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 201 executes a hypervisor 202 that creates a virtual machine platform on which guest operating systems may execute. In these embodiments, the computing device 201 can be referred to as a host server. An example of such a computing device is the XEN SERVER provided by Citrix Systems, Inc., of Fort Lauderdale, Fla.

In one embodiment, the hypervisor 202 can create a virtual machine 232A-B (generally 232) in which an operating system 230 executes. In one of these embodiments, for example, the hypervisor 202 loads a virtual machine image to create a virtual machine 232. In another of these embodiments, the hypervisor 202 executes an operating system 230 within the virtual machine 232. In still another of these embodiments, the virtual machine 232 executes an operating system 230.

In one embodiment, the hypervisor 202 controls the execution of at least one virtual machine 232. In another embodiment, the hypervisor 202 presents at least one virtual machine 232 with an abstraction of at least one hardware resource provided by the computing device 201. The abstraction can further be referred to as a virtualization or virtual view of the hardware, memory processor and other system resources available on the computing device 201. Hardware or hardware resources, in some embodiments, can be any hardware resource available within the hardware layer 210. In other embodiments, the hypervisor 202 controls the manner in which virtual machines 232 access the physical processors 208 available in the computing device 201. Controlling access to the physical processors 208 can include determining whether a virtual machine 232 should have access to a processor 208, and how physical processor capabilities are presented to the virtual machine 232.

In some embodiments, the computing device 201 can host or execute one or more virtual machines 232. A virtual machine 232 can be called a domain, a guest and/or a DOMAIN U or domU. A virtual machine 232 is a set of executable instructions that, when executed by a processor 208, imitate the operation of a physical computer such that the virtual machine 232 can execute programs and processes much like a physical computing device. While FIG. 2A illustrates an embodiment where a computing device 201 hosts three virtual machines 232, in other embodiments the computing device 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. The hypervisor 202, in other embodiments, provides each virtual machine 232 with a substantially similar virtual view of the physical hardware, memory, processor and other system resources available to the virtual machines 232.

Each virtual machine 232 can include a virtual disk 226A-C (generally 226) and a virtual processor 228A-C (generally 228.) The virtual disk 226, in some embodiments, is a virtualized view of one or more physical disks 204 of the computing device 201, or a portion of one or more physical disks 204 of the computing device 201. The virtualized view of the physical disks 204 can be generated, provided and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the computing device 201. In some embodiments, the virtualized view of the physical processors 208 can be generated, provided and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

A control program 220 may execute at least one application for managing and configuring the guest operating systems executing on the virtual machines 232 and in some embodiments the computing device 201. In some embodiments, the control program 220 can be called a control operating system, a control domain, domain 0 or dom0. The control program 220, in some embodiments, can be DOMAIN 0 or DOM0 of the XEN hypervisor. Thus, in some embodiments, control program 220 may be executed within a control virtual machine or dom0 virtual machine, may be executed by the hypervisor, or may be executed by an operating system executing the hypervisor. The control program 220 can execute an administrative application or program that can further display a user interface which administrators can use to access the functionality of each virtual machine 232 and/or to manage the virtual machines 232. In some embodiments, the user interface generated by the administrative program can be used to terminate the execution of virtual machines 232, allocate resources to virtual machines 232, assign permissions to virtual machines 232, or manage security credentials associated with virtual machines 232. The control program 220, in some embodiments, can start new virtual machines 232 or terminate execution of executing virtual machines 232. In other embodiments, the control program 220 can directly access hardware and/or resources within the hardware layer 210. In still another embodiment, the control program 220 can interface with programs and applications executing on the computing device 210 and outside of the context of a virtual machine 232. Similarly, the control program 220 can interface with programs and applications executing within the context of a virtual machine 232.

In one embodiment, the hypervisor 202 can execute the control program 220 within a virtual machine 232. The hypervisor 202 can create and start the virtual machine 232. In embodiments where the hypervisor 202 executes the control program 220 within a virtual machine 232, that virtual machine 232 can be referred to as the control virtual machine 232. In still another embodiment, the control program 220 executes within a virtual machine 232 that is authorized to directly access physical resources on the computing device 201.

In some embodiments, a control program 220A (Not Shown) on a first computing device 201A (Not Shown) may exchange data with a control program 220B (Not Shown) on a second computing device 201B (Not Shown). In these embodiments the first computing device 201A may be located remote from the second computing device 201B. The control programs 220A-B can exchange data via a communication link between a hypervisor 202A (Not Shown) executing on the first computing device 201A and a hypervisor 202B (Not Shown) executing on the second computing device 201B. Through this communication link, the computing devices 201A-B can exchange data regarding processors and other physical resources available in a pool of resources. Further, through this connection between hypervisors 202A-B, the hypervisors 202A-B can manage a pool of resources, e.g. the resources available on the first computing device 201A and the second computing device 201B, distributed across one or more computing devices 201A-B. The hypervisors 202A-B can further virtualize these resources and make them available to virtual machines 232 executing on the computing devices 201A-B. In another instance of this embodiment, a single hypervisor 202 can manage and control virtual machines 232 executing on both computing devices 201A-B.

In some embodiments, the control program 220 interacts with one or more guest operating systems 230A-B (generally 230.) The control program 220 can communicate with the guest operating systems 230 through a hypervisor 202. Through the hypervisor 202, the guest operating system 230 can request access to physical disks 204, physical processors 208, memory 216, physical devices 206 and any other component in the hardware layer 210. In still other embodiments, the guest operating systems 230 can communicate with the control program 220 via a communication channel established by the hypervisor 202, such as, for example, via a plurality of shared memory pages made available by the hypervisor 202.

In some embodiments, the control program 220 includes a network back-end driver for communicating directly with networking hardware provided by the computing device 201. In one of these embodiments, the network back-end driver processes at least one virtual machine request from at least one guest operating system 230. In other embodiments, the control program 220 includes a block back-end driver for communicating with a storage element on the computing device 201. In one of these embodiments, the block back-end driver reads and writes data from the storage element based upon at least one request received from a guest operating system 230.

In another embodiment, the control program 220 includes a tools stack 224. In another embodiment, a tools stack 224 provides functionality for interacting with the hypervisor 202, communicating with other control programs 220 (for example, on a second computing device 201B), or managing virtual machines 232 on the computing device 201. In another embodiment, the tools stack 224 includes customized applications for providing improved management functionality to an administrator of a virtual machine farm. In some embodiments, at least one of the tools stack 224 and the control program 220 include a management API that provides an interface for remotely configuring and controlling virtual machines 232 running on a computing device 201. In other embodiments, the control program 220 communicates with the hypervisor 202 through the tools stack 224.

In one embodiment, the hypervisor 202 executes a guest operating system 230 within a virtual machine 232 created by the hypervisor 202. In another embodiment, the guest operating system 230 provides a user of the computing device 201 with access to resources within a computing environment. In still another embodiment, a resource includes a program, an application, a document, a file, a plurality of applications, a plurality of files, an executable program file, a desktop environment, a computing environment, or other resource made available to a user of the computing device 201. In yet another embodiment, the resource may be delivered to the computing device 201 via a plurality of access methods including, but not limited to, conventional installation directly on the computing device 201, delivery to the computing device 201 via a method for application streaming, delivery to the computing device 201 of output data generated by an execution of the resource on a second computing device 201' and communicated to the computing device 201 via a presentation layer protocol, delivery to the computing device 201 of output data generated by an execution of the resource via a virtual machine executing on a second computing device 201', or execution from a removable storage device connected to the computing device 201, such as a USB device, or via a virtual machine executing on the computing device 201 and generating output data. In some embodiments, the computing device 201 transmits output data generated by the execution of the resource to another computing device 201'.

In one embodiment, the guest operating system 230, in conjunction with the virtual machine on which it executes, forms a fully-virtualized virtual machine that is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 202. In such an embodiment, the driver is typically aware that it executes within a virtualized environment.

In another embodiment, the guest operating system 230, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control program 220, as described above.

Figure 2B:
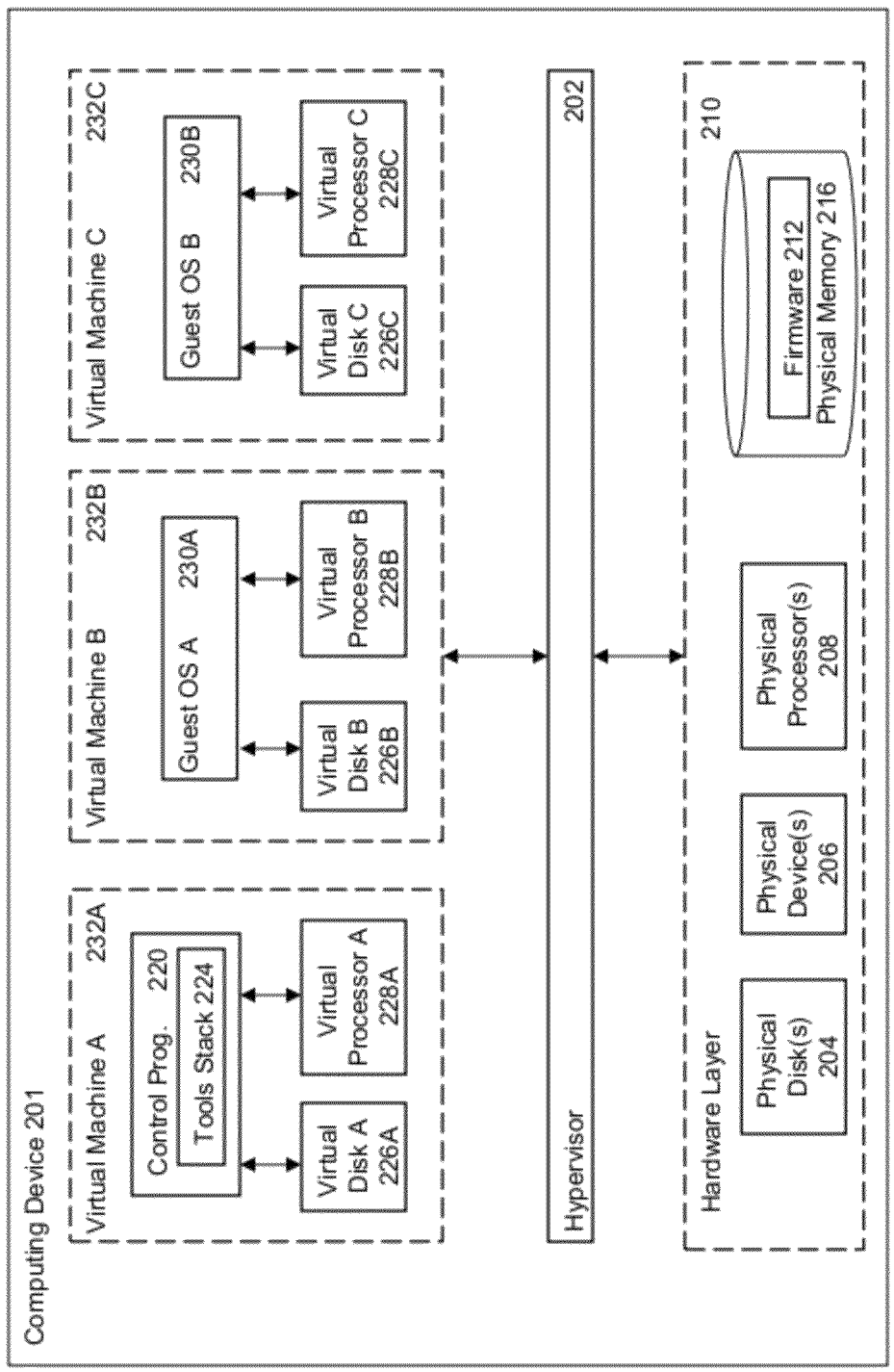

Illustrated in FIG. 2B is another embodiment of a virtualization environment that illustrates a Type 1 hypervisor 202. Executing on the computing device 201 is a hypervisor 202 that can directly access the hardware and resources within the hardware layer 210. Virtual machines 232 managed by the hypervisor 202 can be a non-trusted virtual machine 232B and/or a trusted virtual machine 232C. Whereas the virtualization environment depicted in FIG. 2A illustrates a host operating system 214, the virtualization environment embodiment in FIG. 2B does not execute a host operating system.

Further referring to FIG. 2B, and in more detail, the virtualization environment includes a Type 1 hypervisor 202. Type 1 hypervisors 202, in some embodiments, execute on "bare metal," such that the hypervisor 202 has direct access to all applications and processes executing on the computing device 201, all resources on the computing device 201 and all hardware on the computing device 201 or communicating with the computing device 201. While a Type 2 hypervisor 202 accesses system resources through a host operating system 214, a Type 1 hypervisor 202 can directly access all system resources. The Type 1 hypervisor 202 can execute directly on one or more physical processors of the computing device 201, and can include program data stored in the physical memory 216.

In a virtualization environment that employs a Type 1 hypervisor 202 configuration, the host operating system can be executed by one or more virtual machines 232. Thus, a user of the computing device 201 can designate one or more virtual machines 232 as the user's personal machine. This virtual machine can imitate the host operating system by allowing a user to interact with the computing device 201 in substantially the same manner that the user would interact with the computing device 201 via a host operating system 214.

C. Systems and Methods for Redirecting Access Requests Between Secure and Unsecure Virtual Machines Virtual machines 232 can be unsecure virtual machines 232B and secure virtual machine 232C. In some embodiments, a virtual machine's security can be determined based on a comparison of the virtual machine to other virtual machines executing within the same virtualization environment. For example, were a first virtual machine to have access to a pool of resources, and a second virtual machine not to have access to the same pool of resources; the second virtual machine could be considered an unsecure virtual machine 232B while the first virtual machine could be considered a secure virtual machine 232A. In some embodiments, a virtual machine's ability to access one or more system resources can be configured using a configuration interface generated by either the control program 220 or the hypervisor 202. In other embodiments, the level of access afforded to a virtual machine 232 can be the result of a review of any of the following sets of criteria: the user accessing the virtual machine; one or more applications executing on the virtual machine; the virtual machine identifier; a risk level assigned to the virtual machine based on one or more factors; or any other similar criteria. For example, in one embodiment, a virtual machine may be considered secure or trusted if the virtual machine's disk image is encrypted or is a read-only image, if an operating system of the virtual machine includes an anti-virus program or an active firewall, or any other criteria.

In some embodiments, the environments of virtual machines executing on a host are segregated, shielded or protected from one another. For example, the hypervisor or control virtual machine 232A managing these virtual machines may limit communications between the virtual machines. Each memory allocation, disk partition, and allocation of other resources assigned to each virtual machine may be respectively locked or encrypted from other virtual machines. In some embodiments, portions of hardware resources allocated to each virtual machine during certain time slots are flushed or cleared before re-assignment to another virtual machine.

In some other embodiments, certain virtual machines may have access to the same resources, or have a similar level of access to the same resources. Virtual machines sharing the same or similar access rights may share the same classification and be classified as secure or unsecure relative to other groups of virtual machines. For example, virtual machines having shared access to certain protected corporate data may be designated as secure, while virtual machines not having access to these protected corporate data may be designated as unsecure. In certain embodiments, a secure virtual machine may be able to share data or applications with another secure virtual machine. In contrast, the environments of unsecure virtual machines may be individually locked from external communications, and may have limited access to other virtual machines, to isolate these from other environments for example. In other embodiments, unsecure virtual machines may have certain freedom to share data or applications with each other.

In some embodiments, a secure virtual machine is a virtual machine that is launched or accessed responsive to a user providing authentication credentials. In other embodiments, a secure virtual machine is a virtual machine that is launched or accessed responsive to a user providing additional authentication credentials relative to that required to launch or access another virtual machine. In one embodiment, a secure virtual machine is associated with an encrypted image on disk that boots when the user provides the required authentication credentials. Authentication credentials may comprise a user name, real name, login name, account name, password, serial number, encryption key, SecurID, or any other item of information identifying the user. In many embodiments, the secure virtual machine may be booted responsive to verifying the authentication credentials against an authorized database of users. The database may be hosted by another virtual machine such as a control virtual machine, by a host virtual machine, by the hypervisor, or by another computing device. For example, in one such embodiment, a user may provide authentication credentials to a control program 220 to initiate booting of a secure virtual machine, and the control program 220 may establish a network communication with a remote computing device and transmit the authentication credentials to the remote computing device. The remote computing device may verify the credentials and respond with an indication of whether the user is authorized to boot the secure virtual machine. In many embodiments, whether a virtual machine is considered secure may be equivalent to whether the user booting the virtual machine has permission from a security component to boot the machine. In some embodiments, a secure virtual machine may be referred to as a trusted virtual machine, and accordingly these terms may be used interchangeably.

In some embodiments, unsecure or unsecure virtual machines 232B may be prevented from accessing resources, hardware, memory locations, and programs that secure virtual machines 232A may access. For example, a secure virtual machine 232C may be able to access one or more company resources, while the unsecure virtual machine 232B may not be allowed to access certain company resources.

In many embodiments, a computing device may host a plurality of virtual machines, including secure and unsecure virtual machines. For example, a user may simultaneously use an unsecure virtual machine for playback of personal music files, while using a secure virtual machine for accessing a corporate network. It may be desirable to separate these activities to keep the corporate network secure, while still allowing users the freedom to access personal data or operate personal devices and applications. While segregating these activities may be desirable from a security standpoint, in many embodiments, the unsecure and secure virtual machines may need to communicate. For example, if a user has a first application with a first window open in a first virtual machine, and a second application with a second window in a second virtual machine, the user may expect only one window to have focus, receive mouse and keyboard input, or be foremost in a z-order at any one time. Accordingly, the two virtual machines may need to coordinate focus and communicate other information.

Communication between a secure, company-specific virtual machine and an unsecure, personal virtual machine can be difficult. In some embodiments, communications between secure and unsecure virtual machines are established via traditional network connections. These solutions can pose security risks to the virtual machines because virtual machines often need to be isolated on different network segments.

Communication between secure and unsecure virtual machines may, in some embodiments, be referred to as virtual-to-virtual or V2V technology. This mechanism may provide systems for inter-domain communication between both privileged and non-privileged domains running under a hypervisor. In one embodiment, the mechanism includes providing an API (Application Programmers Interface) that can be used in both kernel and user modes. The API can be present in any operating system running as a domain under the hypervisor, including Windows and Linux, or any other operating system.

In one embodiment, the V2V API allows two domains or virtual machines to establish a channel of communication. In brief overview, one end of the channel starts as a listening endpoint. The other end can then connect to the listening endpoint. Once the channel is established, the two domains can send messages back and forth on the channel. When either end is finished communicating, it can disconnect the channel and free the associated resources.

In some embodiments, the message passing part of the API can be a low level program that permits any block of data to be sent and received. In some embodiments, V2V provides no transport layer semantics or higher layer functionalities. Thus, in many embodiments and unlike using network interfaces for communicating between virtual machines, messages may not need not be encapsulated with addresses or other headers. In other embodiments, other protocols can be built on top of the V2V API to provide higher level services.

In some embodiments, underlying event channel and shared memory architecture can be used between front end and back end para-virtual driver pairs. V2V, in some embodiments, establishes an API over these driver pairs to make them generic and reusable. V2V may be unique in that it provides a means of communication between domains that is based on the underlying hypervisor functionality. In particular, V2V can use the CITRIX Xen facilities to share memory pages between domains and the functionality to allow domains to send events to other domains via interrupts.

V2V usage, security and access control can be controlled by components in the control program, or the control program tool stack, discussed above. Although discussed herein primarily in terms of communication between virtual machines with different security or privilege levels, these systems and methods may be used for communications between two unsecure virtual machines, two secure virtual machines, a dom0 or control virtual machine and a secure or unsecure domU virtual machine, or any other combination of virtual machines.

Figure 3A:
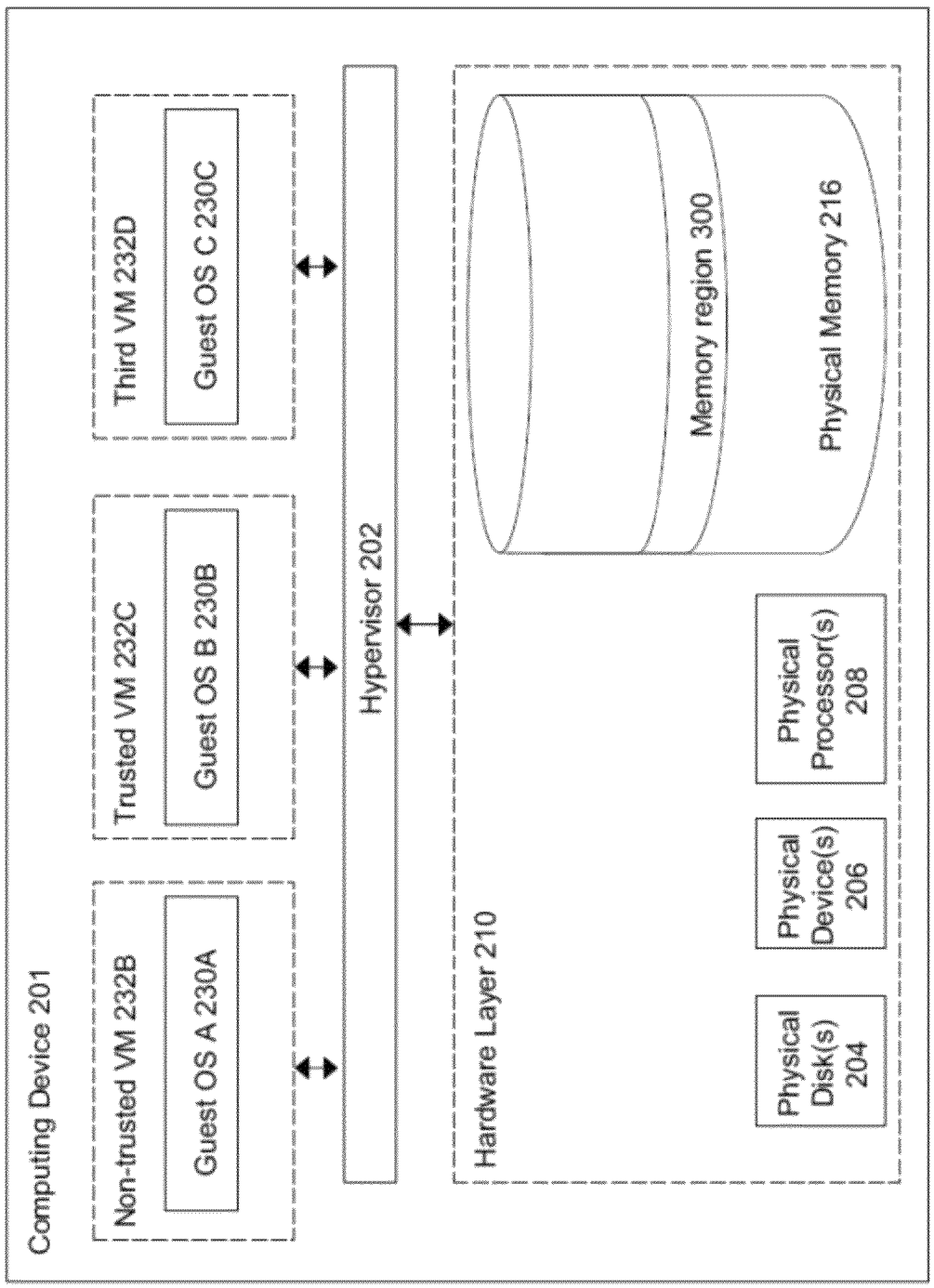
FIG. 3A is a block diagram depicting an embodiment of a system for communication between secure and unsecure virtual machines.

Referring briefly now to FIG. 3A, illustrated is a block diagram of an embodiment of a system for communication between secure and unsecure virtual machines. In addition to features discussed above in connection with FIGS. 2A and 2B, a computing device 201 may include an unsecure virtual machine 232B, a secure virtual machine 232C. The computing device 201 may also include a third virtual machine 232D which can be a control virtual machine. Physical memory 216 may include a region of memory 300 that is reserved by the secure virtual machine 232C, discussed in more detail below. In some embodiments, one or more virtual machines may execute a communication agent (not shown) which may comprise a program, application, service, daemon, sub-routine, logic, or other executable instructions for establishing and communicating via a secure channel.

Figure 3B:
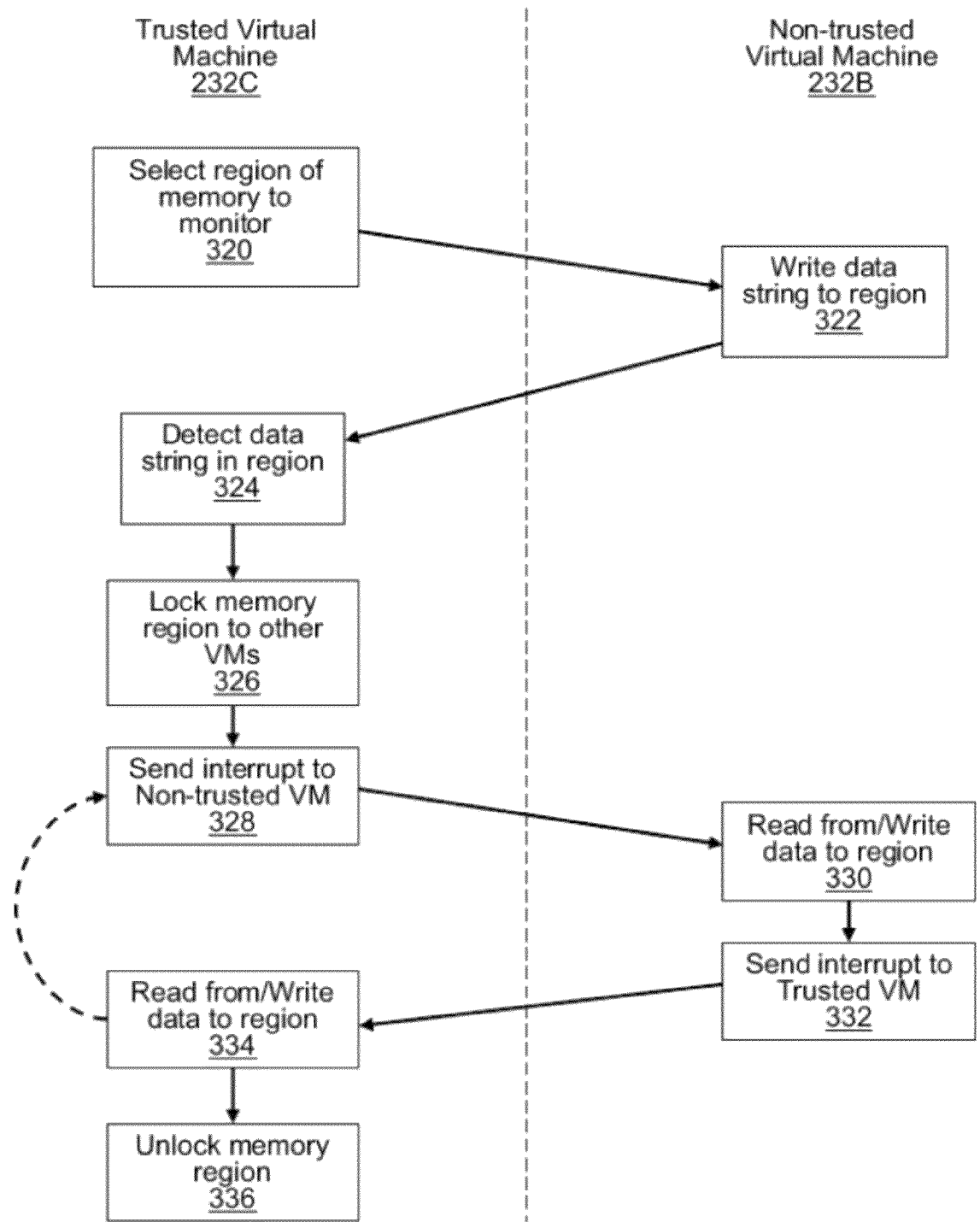
FIG. 3B is a flow diagram of an embodiment of a method for communication between secure and unsecure virtual machines.

Referring now to FIG. 3B, illustrated is a flow diagram of one embodiment of a method for establishing a secure communication channel between an unsecure virtual machine and a secure virtual machine. In brief overview, a first virtual machine such as a secure virtual machine, or a communication agent executed by the first virtual machine, may establish itself as a listening endpoint by, at step 320 selecting a region of memory 300 to monitor. At step 322, a second virtual machine such as an unsecure virtual machine may write a data string to the selected region. At step 324, the secure virtual machine may detect the data string in the selected region. At step 326, the secure virtual machine may be lock the memory region to exclude a third virtual machine or others from reading or writing to the memory region, while allowing the secure virtual machine and unsecure virtual machine to read and write to the memory region. At step 328, the secure virtual machine may send an interrupt to the unsecure virtual machine. At step 330, the unsecure virtual machine may write data to the region, or as the communication proceeds, may also read data from the region. At step 332, the unsecure virtual machine may send an interrupt to the secure virtual machine. At step 334, the secure virtual machine may read from and/or write data to the region. Steps 328-334 may be repeated until communication is complete. At step 336, the secure virtual machine may unlock the memory region, allowing a third virtual machine access to the memory region.

Still referring to FIG. 3B and in more detail, in one embodiment a virtual machine establishes itself as a communications endpoint by selecting a region of memory to monitor. In some embodiments, the virtual machine can be a secure or trusted virtual machine, while in other embodiments the virtual machine can be an unsecure or non-trusted virtual machine. In one embodiment, the virtual machine can establish itself as a listening endpoint. In other embodiments, the virtual machine can establish itself as a transmitting endpoint. In still other embodiments, the virtual machine can establish itself as a communication endpoint able to send or receive data over the communication channel.

In one embodiment, the virtual machine can establish itself as a listening endpoint in response to a request from another virtual machine to transfer data to the virtual machine. In some embodiments, at step 320, a virtual machine establishes itself as a listening endpoint by selecting a group of memory addresses, one or more memory pages, or another portion of the physical memory 216 as a common storage region 300 for both the listening virtual machine and the transmitting virtual machine. In other embodiments, a virtual machine can establish itself as a listening endpoint via a communication agent executing within the virtual machine. The communication agent, in response to an indicator, can select one or more memory locations and tag them or otherwise partition them as memory to be exclusively used by the virtual machine and any transmitting endpoint that connects with the virtual machine. In some embodiments, the virtual machine may periodically monitor the memory region for new data, or may receive an interrupt when new data is written to the memory region.

In some embodiments, at step 322, another virtual machine connects to the listening endpoint of the initial virtual machine to create a communication channel. In certain embodiments, the virtual machine establishes itself as a transmitting endpoint when it connects to the listening endpoint of the initial virtual machine. In one embodiment, the transmitting endpoint can connect to the listening endpoint by writing a predetermined string of data to the memory region selected by the listening endpoint. Such predetermined string may comprise an identifier of the transmitting endpoint or virtual machine wishing to establish itself as the transmitting endpoint, to allow the listening endpoint to exclude others from the communication channel. This data may be detected by the listening endpoint at step 324. In another embodiment in which other, non-secure communications paths exist, the transmitting endpoint may use one of these communications paths to send a message to the listening endpoint, indicating it wishes to establish a secure communication channel with the listening endpoint. In some embodiments, a communication agent on the transmitting endpoint transmits a message to a communication agent on the listening endpoint indicating that the transmitting endpoint would like to communicate with the listening endpoint. The message transmitted to the listening endpoint, in some embodiments, is an interrupt that can be received by the listening endpoint virtual machine and processed.

In some embodiments at step 326, upon receiving a notification that a transmitting endpoint would like to communicate with the listening endpoint, the communication agent on that virtual machine can tag the reserved memory so that it can be accessed only by the listening endpoint and the transmitting endpoint. The communication channel established between the listening endpoint and the transmitting endpoint can include the shared memory pages or memory addresses accessible only by the listening endpoint and the transmitting endpoint. In other embodiments, the communication channel can include a secure communication connection between the transmitting endpoint and the listening endpoint. In further embodiments, this secure communication channel can include encoding, encrypting or otherwise encapsulating data such that only the listening endpoint can decode, decrypt or otherwise un-encapsulate the transmitted data.

Upon creating the communication channel between the listening endpoint and the transmitting endpoint, in some embodiments at step 328, the listening endpoint may send an interrupt to the transmitting endpoint to indicate that the communication channel is established and ready for secure transfer of data.

At step 330, the transmitting endpoint can copy data to the shared memory page. Upon copying data to the shared memory page, the transmitting endpoint virtual machine can issue an interrupt, at step 332, to the listening virtual machine to indicate that data was copied into the shared memory. In some embodiments, this interrupt can be issued by a communication agent. In other embodiments, this interrupt can be issued by a physical device or network card.

The listening endpoint, upon determining that data was copied to the shared memory page, can retrieve the copied data from the shared memory page at step 334. Determining that data was copied to the shared memory page can include receiving the interrupt issued by the transmitting virtual machine, and the retrieval may be performed responsive to receipt of the interrupt.

The method may, in some embodiments, include a transmission virtual machine that issues an interrupt to the listening virtual machine when data is copied to the shared memory page, and when the transmitting virtual machine runs out of space to send more data. In some embodiments, the listening virtual machine receives the interrupt and responds by either retrieving data or allocating additional memory addresses or pages to the shared memory repository. Upon allocating additional memory to the shared memory repository, the listening virtual machine can issue an interrupt to the transmitting virtual machine that additional memory was added to the shared memory repository. In some embodiments, the listening virtual machine can respond to the interrupt regarding limited memory by clearing data from the shared memory pages to free up space.

In some embodiments, steps 328-334 may be repeated for the duration of the communication, with either endpoint writing data to the shared memory region and reading data written by the other endpoint. Upon completion of the communication transaction or session, at step 336, in some embodiments, the listening endpoint may unlock the memory region such that a third virtual machine may access the memory region. In other embodiments, the transmitting endpoint may unlock the memory region. In many embodiments, prior to unlocking the memory region, the endpoint may first wipe the memory region or write null or random data to the region to remove any sensitive information.

Through the above discussed method, data of various sizes and content may be transmitted between the secure and unsecure virtual machines without other virtual machines being able to intercept or otherwise read the communication. In some embodiments, data may be transmitted between the secure and unsecure virtual machines without necessarily requiring encryption or encapsulation.

In an organization such as a corporation, a user may have access to one or more machines for accessing the organization's resources. Some of these machines may execute one or more hypervisors that can manage virtual machines for executing company applications and accessing company resources. With the proliferation of cloud computing and virtualization, a user may have access to one or more virtual machines hosted on a client machine (e.g., assigned to the user), or on a remote server machine (e.g., accessed by multiple users). Often a user may perform personal tasks or access personal information from within the environment of any of these virtual machines. In order to protect company applications and resources, a company may wish to limit exposure of corporate documents, information and applications from personal or potentially unsecure activities.

In some embodiments, a user may access personal or unsecure resources such as personal information, URLs, and application. For example, a user may download personal files from a personal email account, download files such as music, stream video, receive RSS feeds from personal subscriptions, etc. In some embodiments, a user may access an external network or website via a browser or other application, potentially exposing the user's virtual machine environment to the external network. For example, an application running in the external network may have access to the file system of the user's virtual machine environment. In some cases, a user may intentionally or inadvertently download and install applications that have not been screened for the corporate network. These may include computer viruses, spyware and other malware. Other examples may include web browser widgets or add-ons, drop boxes and instant messaging applications.

In some embodiments, a user may attach a personal or unsecure peripheral device, such a storage device, to a corporate machine. The peripheral device may further include a program, driver or application that may self-install on the host machine (which may be a virtual machine), execute on the host machine, access information on the host machine, or activate applications on the host machine. In yet another example, a user may access a corporate network from a personal device such as a laptop, and use a corporate application to access a potentially unsecure file from the personal device. In view of these illustrative scenarios, an organization may want to identify such activities, and limit such activities to virtual machine environments that are segregated from protected resources of the organization.

As discussed above, a user or a program may initiate a request, for example, to execute an application, access a file, or navigate to a domain identified by a URL. The methods and systems disclosed herein can provide for the interception of such a request. A control virtual machine hosted on a hypervisor can be used to identify whether an application, folder, file or domain is designated as either secure or unsecure. When the request originates from a secure virtual machine, and the requested file, application or URL is unsecure, the request can be redirected to an unsecure virtual machine. When the request originates from an unsecure virtual machine, and the requested file, application or URL is secure, the request can be redirected to a secure virtual machine. Upon redirecting the request to the appropriate virtual machine, that virtual machine can provide access to the requested resource.

In various embodiments, a hypervisor, a control virtual machine or a control program can intercept the request from a user or program to access a resource. The hypervisor, control virtual machine and/or control program are sometimes referred to as Domain 0 or dom0 entities. The hypervisor may host the control virtual machine as well as one or more secure and/or unsecure virtual machines. The hypervisor or the control virtual machine may provide the control program, which can execute on a processor of a physical machine hosting the hypervisor. In some embodiments, the control program is a virtualized program executing on a virtual processor of the control virtual machine. By way of illustration and not intended to be limiting in any way, portions of the following discussion may generally reference the control virtual machine 232A as the entity intercepting the request.

In various embodiments, the control virtual machine 232A may target requests from a secure virtual machine, an unsecure virtual machine, or both, to intercept. An application or program may initiate the request from within a secure or unsecure virtual machine. The request may comprise, or be translated into one or more system calls, hypercalls, interrupts, or other messages. Some of these may be passed to the underlying hypervisor or hardware layer for processing. In some embodiments, virtual machines are configured to pass all or specific types of requests through the control virtual machine 232A or hypervisor, whereupon the control virtual machine 232A can intercept at least some of these requests. In certain embodiments, virtual machines are configured to send all or specific types of requests to the control virtual machine 232A. In yet other embodiments, the control virtual machine 232A detects or intercepts a request from a virtual machine as the request translates into hypercalls, system calls or interrupts for processing by the hypervisor or hardware layer, for example. A request may be initiated as, or translated into a V2V communication described above in connection with FIGS. 3A and 3B.

In some embodiments, a user initiates a request through an input device such as a remote control, track ball, mouse, touch pad, touch screen and keyboard. Virtualization environments may present additional complexities supporting input devices. Because a hypervisor sits between virtual machines and the hardware layer, event notifications may not be properly forwarded to one or more virtual machines. The control virtual machine 232A may include a control program or input manager that receives input data from an input device. Input data can comprise any type or form of user action (e.g., corresponding to a mouse click), command, instruction or data. Input data, in some embodiments, can be received by a driver executing on the host device 201 within the hardware layer 210. Upon receiving the input data, in one embodiment, the driver can forward a formatted version of the input data to the control program 220 executing on the computing device 201. An input manager, in some embodiments, executes within the control program 220 such that when the control program receives the input data, the input manager also receives the input data.

The input manager, in some embodiments, can determine which virtual machine is in focus when the input device is activated. When a particular virtual machine receives focus, the change focus event can be forwarded to the input manager so that the input manager knows substantially all the time whether the secure virtual machine window has focus. When an input device is actuated, the corresponding driver may issue an event notification, such as a system call or interrupt. The input manager can intercept the system call or interrupt, and usually directs the system call or interrupt to the virtual machine in focus. However, as will be discussed later, the control virtual machine 232A can redirect any system call or interrupt corresponding to a particular resource request, to another virtual machine.

The control virtual machine 232A may identify if the requested resource is secure or unsecure. The control virtual machine 232A may determine that an application executing within a virtual machine issued a command to open an unsecure file, execute an unsecure application or navigate to an unsecure website. The control virtual machine 232A may determine whether the application, file or URL is secure by referring to a configuration file, record or database that lists unsecure and/or secure applications, files, folders, domains, resources or activities. For example, the control virtual machine 232A may intercept a request to open a file having the file extension *.vsd. The control virtual machine 232A may determine that all files having certain file extensions, such as *.vsd, are designated as unsecure. The control virtual machine 232A may alternatively or further determine, using file type association, that the requested file is a Visio file and may determine that Visio is designated as an unsecure application.

In some embodiments, the control virtual machine 232A may determine that the requested file is unsecure because it resides in a file structure, database, peripheral device or file server that is unsecure. The control virtual machine 232A may also determine that the requested file is unsecure because of certain attributes of the file. For example, the requested file may be unsecure because the file is an executable file, the file may be a new file that has not been scanned for viruses, the file type may be unknown, or the ownership and permissions configured for the file may be suspect. Similarly, the control virtual machine 232A may determine that a requested file may be secure based on file type association, file attributes, file source and ownership, etc. In addition, the control virtual machine 232A may determine that a requested file is secure because the file is encrypted or password protected.

The control virtual machine 232A may intercept a request for accessing an application. Certain applications may be vulnerable to attack by viruses and malware. Some application resources may be limited due to cost and/or the availability of a limited number of usage licenses. Certain applications may be an access point to sensitive or protected information. As such, some of these applications may be designated as unsecure or restricted. Moreover, as with files, an application may reside at an unsecure location, such as a peripheral device. Certain requested applications may be unsecure or unauthorized web applications. An application may also be unsecure due to inherent, configured or unknown attributes. For example an application may be unsecure because it is of unknown application type, or have executable permissions that are suspect. In some embodiments, a requested application is designated unsecure when it is invoked to open a file via a file type association which is suspect or restricted.

By way of illustration, the following discusses one approach for determining whether files or applications on a peripheral device are secure or unsecure. This allows a control virtual machine 232A to determine whether to redirect a request to access the peripheral device, and to redirect the request to either a secure or unsecure virtual machine. A peripheral device may be a USB device, for example. USB devices are plug-and-play devices and thus may frequently include firmware and ACPI tables. A computing device 201 may connect to or communicate with a USB device via a USB port. The USB device may have one or more attributes, such as a serial number, device type, presence of encryption, or other features.

In some embodiments, a control program of a control virtual machine 232A may include or access a set of security policies stored on the computing device 201 in a memory element or storage repository accessible to the control program 220. In some embodiments, the security policies can be stored in a database on the computing device 201. The security policies, in some embodiments, can be a set of policies used by the control program 220, a policy engine of the control virtual machine 232A or hypervisor 202, or any other program to determine any of the following: whether a virtual machine 323 can access one or more memory elements, devices, processors or disks; whether a user can access one or more memory elements, devices, processors or disks; whether a device should be made available to one or more virtual machines 232; whether one or more commands or requests generated by an application executing within a virtual machine 232 should be forwarded to a device on the computing device 201; and whether one or more requests generated by an application executing within a virtual machine 232 should be forwarded to a device on the computing device 201. The policy engine may comprise an agent, service, program, application, routine, logic or other executable code for using the security policies to determine whether one or more actions are permitted.

In some embodiments, a control program executing on a computing device within a virtualization environment may receive data that indicates a device was plugged into a USB port of the computing device. Receiving data indicating that a device was plugged into a USB port, in some embodiments, can include receiving an interrupt generated responsive to device being plugged into the USB port. The interrupt can be serviced by firmware and forwarded to the control program. In certain embodiments, the data can include a plug-and-play event notification generated by the control program or an operating system executing on the control virtual machine.

The control program may identify one or more attributes of the device. Identifying the device attributes may include querying the USB port for information about the device. This information may include any of the following: serial number; device identifier; device type; a device driver of the device; the presence of encrypted data on the device; or data on the device being locked or read-only. Responsive to application of one or more security policies to the one or more identified attributes, the control virtual machine 232A may determine whether the USB device and its contents are secure. In some embodiments, the control program may select a virtual machine from a plurality of virtual machines to grant access to the peripheral device. The control program may limit access to the contents of the USB device to the selected virtual machine by mounting or mapping the device to the selected virtual machine.

Access to contents of a virtual disk drive, which may be visible to a virtual machine, can be similarly restricted based on whether the control program determines it to be secure or unsecure. In some embodiments, the contents may be designated secure or unsecure on a transaction basis, i.e., depending on the type of transaction requested by the originating virtual machine on the contents. For example, for read-only transactions, contents may be designated as secure. The virtual disk drive may be mapped to one or more physical disk drives. When a guest operating system 230 of a virtual machine issues read and write commands to the virtual disc drive, a drive manager executing within the context of the control program 220 can intercept these read/write commands. The control program can determine whether to pass the read/write requests to the hardware layer 210 on behalf of the originating virtual machine, based on whether the requested resource and the originating virtual machine are secure or not.

Apart from requests to access files and applications, the control virtual machine 232A may intercept a request for accessing a communications interface, communications network stack, URL, domain or network. A user may request access to a webpage or file for download via a URL or hyperlink. In some embodiments, a user or program may request remote access to a file or application. A user or program may also request access to a network, website or other remote destination via a browser, or a communications utility such as ftp or a network drop box. Certain remote login or access utilities, such as "ssh" or "rsync", may be invoked from certain machines or virtual machines. Some of these access activities may open a local network to malicious applications introduced through uncontrolled access. As such URLs, domains, networks, remote servers, remote destinations, sometimes associated with certain access activities, may be designated as unsecure. In some embodiments, a network or physical machine that may be accessed by a virtual machine through a particular network interface (e.g., using a particular network interface driver) or network stack, may be deemed unsecure.

In some embodiments, a requested resource is designated secure or unsecure based on the identity of the requestor. For example, if an unknown application requested a corporate file via a virtual machine, the unknown application may be malicious in nature. Thus, the requested file or resource may be designated as unsecure. In some cases, a user, in a certain virtual machine environments or user sessions may not have permissions or privileges to access certain resources. Accordingly, the requested resource may be designated as unsecure under these and other situations.

Figure 4A:
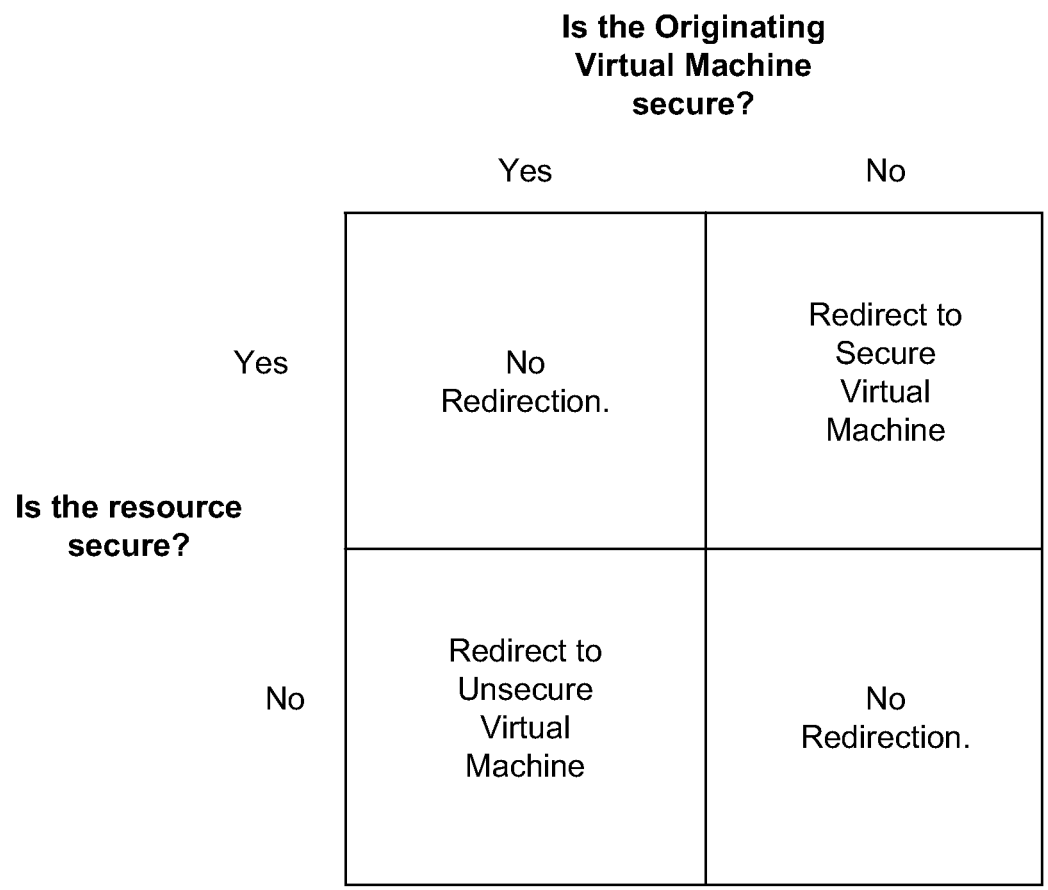
FIG. 4A is a chart of an embodiment of a method for redirecting access requests between secure and unsecure virtual machines.

The control virtual machine 232A may redirect a request originating from one virtual machine to another virtual machine instead. FIG. 4A depicts a chart showing one embodiment of a method for determining whether to redirect a request from one virtual machine to another virtual machine. In brief overview, the control virtual machine 232A may redirect a request originating from a secure virtual machine to an unsecure virtual machine if the requested resource is unsecure. In another scenario, the control virtual machine 232A may redirect a request originating from an unsecure virtual machine to a secure virtual machine if the requested resource is a secure resource. Under certain circumstances, the control virtual machine 232A may determine that the request is appropriately handled by the virtual machine from which the request originates. In such cases, the control virtual machine 232A may determine not to redirect the request to another virtual machine. For example, the control virtual machine 232A may determine that the request for a secure application originates from a secure virtual desktop environment and can be satisfied by the secure virtual machine.

In some embodiments, the control virtual machine 232A may determine that there are no appropriate virtual machines to redirect a request to. The control virtual machine 232A or hypervisor may establish a new virtual machine to enable a redirection. For example, the control virtual machine 232A may configure and execute a new secure virtual machine on the hypervisor to redirect a request for a secure resource. In certain embodiments, a control virtual machine 232A may lack the resource or ability to establish a new virtual machine to which to redirect a request. The control virtual machine 232A, by accessing the hardware layer of the host, may determine that it cannot allocate sufficient resources on the host to establish an additional virtual machine, for example. In some embodiments, the control virtual machine 232A may determine, for various other reasons, not to establish a new virtual machine to which to redirect a request. For example, the control virtual machine 232A may determine that the request involves a highly risky activity that should not be allowed from both secure and unsecure virtual machines. In such cases, the control virtual machine 232A may deny the request.

In some embodiments, the control virtual machine 232A may redirect the request via V2V communications as described above in connection with FIGS. 3A and 3B. The control virtual machine 232A may redirect or convey the request to the appropriate secure or unsecure virtual machine. In certain embodiments, the control virtual machine 232A, control program or hypervisor instructs the requestor (e.g., requesting application) to redirect the requestor's requests to the appropriate virtual machine, e.g., using V2V communications. The control virtual machine 232A, control program or hypervisor may alternatively instruct the requestor to send a new request directly to the appropriate virtual machine, e.g., via V2V communications. The control virtual machine 232A may redirect any portion or translated version of the request to the appropriate virtual machine. For example, the control virtual machine 232A may intercept and direct system calls, hypercalls, interrupts, or other messages associated with the request to the appropriate virtual machine. Some of these may be passed to the underlying hypervisor or hardware layer for processing. The control virtual machine 232A may, for example, intercept software and/or hardware interrupts triggered by a request in the hardware layer. The control virtual machine 232A can also modify the interrupts prior to processing, so that the request is satisfied in the context of the redirected virtual machine. In some embodiments, the control virtual machine 232A modifies the responses to the interrupts so that the request is completed through the redirected virtual machine. Similarly, systems calls and other messages may be similarly handled so that the request is satisfied through a secure or unsecure virtual machine designated by the control virtual machine 232A.

In some embodiments, for servicing requests generated responsive to actuation of hardware, virtual firmware may be used to communicate requests back and forth between the device firmware and the hosted operating system or systems. A dom0 entity, such as a hypervisor or control virtual machine, has direct access to the hardware of the computing device. Accordingly, when a user issues a request by actuating an input device, the device driver or firmware generates an interrupt, and the dom0 entity can intercept the interrupt or request. The dom0 entity may forward or redirect the interrupt to virtual firmware of a designated (e.g., redirected) virtual machine, which may forward the interrupt to the guest operating system of the designated virtual machine as if it was the original hardware device.

The guest operating system, responsive to receiving the interrupt from the virtual firmware, may send a request to the virtual firmware for objects or routines associated with the interrupt. The virtual firmware may forward the request to the dom0 entity, which may forward the request to the firmware of the hardware device. In some embodiments, the firmware of the hardware device may retrieve the objects and routines associated with the interrupt from memory, such as an Advanced Configuration and Power Interface (ACPI) table, and forward these objects and routines to the dom0 entity. The dom0 entity may forward the objects and routines to the appropriate virtual firmware, which may respond to a respective guest operating system, providing information on how to process the request initiated through the input device. Accordingly, a request for resource can be redirected to the virtual firmware of a designated virtual machine for completion of the request.

Figure 4B:
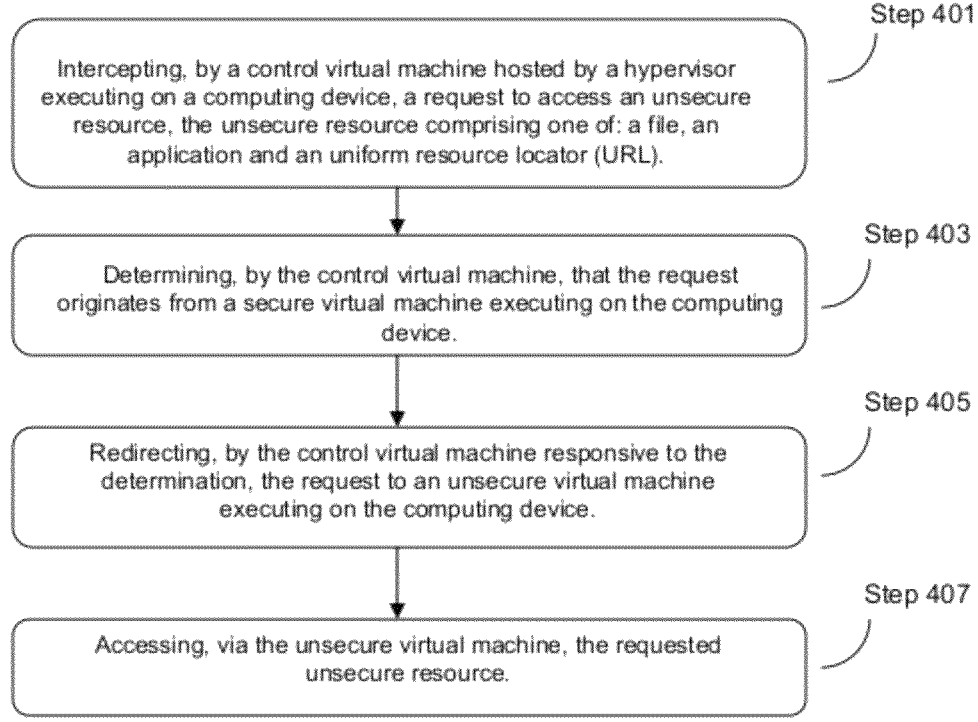
FIG. 4B is a flow diagram of an embodiment of a method for redirecting access requests between secure and unsecure virtual machines.

Illustrated in FIG. 4B is an embodiment of a method for redirecting unsecure content from a secure virtual machine to an unsecure virtual machine. The method can apply to a computing device that executes a hypervisor hosting a secure virtual machine and an unsecure virtual machine. The method includes intercepting, by a control virtual machine hosted by the hypervisor, a request to access an unsecure resource, the unsecure resource comprising one of: a file, an application and an uniform resource locator (URL) (401). The control virtual machine determines that the request originates from a secure virtual machine executing on the computing device (403). The control virtual machine may redirect, responsive to the determination, the request to an unsecure virtual machine executing on the computing device (405). The unsecure virtual machine may provide access to the requested unsecure resource (407).

Further referring to FIG. 4B, and in more detail, a control virtual machine hosted by a hypervisor intercepts a request to access an unsecure resource (Step 401). The unsecure resource may comprise one of a: file, application, network interface, storage device, memory location, disk, remote server, URL, website, domain or network, although not limited to these example resources. The control virtual machine may include or execute a control program for intercepting the request. The control program may execute on one or more processors of the computing device. In some embodiments, the hypervisor comprises a type 1 hypervisor. In some other embodiments, the hypervisor may comprise a type 2 hypervisor.

The control virtual machine 232A may intercept a request initiated from the context or environment of a virtual machine. A user, or an application executing within the virtual machine, may initiate the request for the resource. In some embodiments, intercepting the request can include intercepting any type of command or instruction, such as commands to execute an application, to open a file, to read/write to a file, to navigate to a website identified in a URL, to establish a communications stack, or to initiate a connection to another entity such as another virtual machine, network, server or database. Intercepting the request can, for example, include determining that an application executing within a secure virtual machine issued a command to open an unsecure file, execute an unsecure application or navigate to an unsecure website. In some embodiments, the control virtual machine 232A intercepts or receives the request via V2V communications protocol, as discussed in connection with FIGS. 3A and 3B. The control virtual machine 232A may intercept the request by intercepting interrupts, systems calls, hypercalls, event notifications, or other signals or commands triggered by or translated from the request, as described earlier. The control virtual machine 232A may access some of these messages, such as interrupts, at the hardware level. The control virtual machine 232A may access certain of these messages via the hypervisor. In some embodiments, the control virtual machine 232A may intercept virtual interrupts, systems calls, hypercalls, event notifications, or other signals generated within the context of the originating virtual machine. For example, the control virtual machine 232A may intercept event notifications, issued by a physical or virtual device driver, corresponding to a request.

The control virtual machine 232A intercepting the request can further determine whether the requested resource is secure or unsecure. In some embodiments, the control virtual machine 232A determines whether a requested resource is secure based on file-type association between a requested file and an application. For example, the control virtual machine 232A can intercept a request to open a file having the file extension *.vsd. The control virtual machine 232A can determine, using file type association, that this file is a Visio file and can further determine that Visio is on a list of secure or unsecure applications. In some embodiments, the control virtual machine 232A may determine that the application identified by file-type association is a restricted application or has a limited number of licenses. In other embodiments, the control virtual machine 232A may determine that the copy of the application in the originating application is a version that is incompatible or other mismatched with the requested file. The control virtual machine 232A may also detect that the copy of the application in the originating application is an improper installation or include file permissions that are suspect. Accordingly, the control virtual machine 232A may determine that the application is unsecure and that the associated file is unsecure for access. Conversely, if the control virtual machine 232A determines that the application is secure (e.g., is an accessible, compatible and/or properly installed version), the requested file may be deemed secure by association with the application.

In some embodiments, the control virtual machine 232A determines whether a requested resource is secure based on a predetermined listing of secure and/or unsecure resources. For example, the control virtual machine 232A may determine that a requested application, file, URL or domain is unsecure by referring to a configuration file that lists all unsecure applications, files, folders, domains and other resources. In another example, the application can intercept a request to navigate to the following URL, www.cnn.com. The application can determine that cnn.com is on the list of unsecure domains and may want to redirect the request to navigate to that URL to an unsecure virtual machine. In some embodiments, the configuration file may list secure and/or unsecure resource hosts, providers or locations, such as application servers, databases, disk drives, directories, folders, web servers and websites.

When a requested resource is not predetermined to be secure or unsecure, the control virtual machine 232A may consider the resource as unsecure by default. In certain embodiments, the control virtual machine 232A may apply one or more security policies to determine if a resource is secure. The control virtual machine 232A may, in some embodiments, determine if a requested resource is secure based on a security setting of the requested resource. For example, the file permissions of a requested file may be incorrect or suspect relative to the folder permissions or access level assigned to the requestor of the file. The methods discussed herein may further rely on application settings to determine the security of a requested resource. Application settings may include security settings, e.g., of web browsers. The control virtual machine 232A may determine that a requested application lacks the security features for opening or downloading a file. For example, a requested copy of the browser, such as INTERNET EXPLORER, may be deemed unsecure for lacking a malware monitor or filter ad-on.

The control virtual machine can determine if the request originates from a secure virtual machine executing on the computing device (403). In some embodiments, the control virtual machine 232A may determine that the request originates from a secure virtual machine. In other embodiments, the control virtual machine 232A may determine that the request originates from an unsecure virtual machine. The control virtual machine 232A may determine whether a virtual machine is secure based on an application executing on the virtual machine. For example, an agent of the control virtual machine 232A may detect an illegal add-on to a browser of the virtual machine, or spyware residing on the virtual machine, that can compromise the security of the virtual machine. Such a virtual machine may be identified as unsecure. The control virtual machine 232A may determine that the disk image of the originating virtual machine have been modified without proper authorization by the installation of uncontrolled applications, and may accordingly identify this virtual machine as unsecure. In some embodiments, the control virtual machine 232A may determine that the originating virtual machine has a proper or updated set of applications, and is therefore secure.

In some embodiments, the control virtual machine 232A may determine whether a virtual machine is secure based on an identity of a user accessing the virtual machine. The control virtual machine 232A may recognize that the user lacks privileges to the requested resource, or that the user's privileges are mismatched with that afforded by the virtual machine session. In certain embodiments, the control virtual machine 232A may recognize that the user has a history of improperly accessing personal or unsecure resources. In these cases, the control virtual machine 232A may identify the associated virtual machine as unsecure. Thus, based on the user's assigned privileges, usage history of the virtual machine, or other factors, a control virtual machine 232A may determine that the user's virtual machine is secure or unsecure.

In some embodiments, the control virtual machine 232A may determine whether a virtual machine is secure based on a level of access granted to the virtual machine for accessing one or more resources. In one embodiment, a virtual machine with restricted access to resources may be designated as secure. In another embodiments, a virtual machine with a high level of access to resources may be identified as secure, for example, due to additional security features included in the virtual machine environment. In yet another embodiment, a virtual machine with access to sensitive data or protected resources may be identified as unsecure due to the risk of exposing these resources to improper use of the virtual machine. A control virtual machine 232A may compare one or more virtual machines hosted by a hypervisor and classify some as secure or unsecure based on the relative levels of access granted to each virtual machine. A control virtual machine 232A may further determine whether a virtual machine is secure based on a risk level assigned to the virtual machine. A risk level may be determined based on the user or applications associated with the virtual machine, as discussed above. In addition, a virtual machine may be high risk and therefore unsecure because it lacks the security features appropriate for accessing the requested resource.

Referring to step 405, the control virtual machine 232A redirects the request to an unsecure virtual machine executing on the computing device responsive to the determination. The control virtual machine 232A may redirect a request originating from a secure virtual machine to an unsecure virtual machine if the requested resource is unsecure. In some embodiments, if the requested resource is a secure resource, the control virtual machine 232A redirects the request from an unsecure virtual machine to a secure virtual machine. In certain scenarios, the control virtual machine 232A may determine that the request is appropriately handled by the virtual machine from which the request originates. In such cases, the control virtual machine 232A may determine not to redirect the request to another virtual machine. For example, the control virtual machine 232A may determine that the request for a secure file originates from a secure virtual desktop environment and can be satisfied within that environment.

In some embodiments, the control virtual machine 232A may determine that there is no appropriate virtual machines to redirect a request to. The control virtual machine 232A or hypervisor may establish a new virtual machine to enable the redirection. In certain embodiments, a control virtual machine 232A may lack the resource or ability to establish a new virtual machine to which to redirect a request. In some embodiments, the control virtual machine 232A may determine not to establish a new virtual machine to which to redirect a request that, for example, involve a highly risky activity. Accordingly, the control virtual machine 232A may deny some of these requests. When selecting a virtual machine to redirect the request, the candidate virtual machine may be selected to be able to at least support certain activities in the originating virtual machine. In some embodiments, the control virtual machine 232A may update the target virtual machine with particular configurations of the originating virtual machine.

In certain embodiments, the control virtual machine 232A may redirect or process the request via a virtual machine migration. The control virtual machine 232A may perform one or more of: allocating resources for establishing a new virtual machine for migration to, cloning or copying the configuration of the originating virtual machine, and configuring the new virtual machine to additionally support the request. In some embodiments, the migration may appear transparent or seamless to the requestor. The control virtual machine 232A may switch focus to the migrated virtual machine, whereupon the control virtual machine 232A may terminate the originating virtual machine in some embodiments.

In some embodiments, the control virtual machine 232A may redirect the request via V2V communications as described above in connection with FIGS. 3A and 3B. The control virtual machine 232A may instruct the requestor to send a new request directly to the appropriate virtual machine, e.g., via V2V communications. The control virtual machine 232A may redirect any portion, or a translated version of the request to the appropriate virtual machine. For example, the control virtual machine 232A may intercept and direct system calls, hypercalls, interrupts, or other messages corresponding to the request, to the appropriate virtual machine. Some of these may be intercepted as they are passed to or from the underlying hypervisor or hardware layer for processing. For example, the control virtual machine 232A may modify intercepted interrupts prior to processing in the hardware layer, so that the request is satisfied in the context of the redirected virtual machine. In some embodiments, the control virtual machine 232A modifies the responses to the interrupts so that the request is completed through the redirected virtual machine. Systems calls and other messages may be similarly handled so that the request is satisfied by a secure or unsecure virtual machine designated by the control virtual machine 232A.

In one embodiment, redirection can include generating or displaying a window in the secure virtual machine environment, where the window is actually a window executing within the unsecure virtual machine. In this embodiment, the window appears to the end user as though it executes within the secure virtual machine. However, the window may be actually executing within the context of the unsecure virtual machine. For example, the opened window can execute an instance of an internet browser and the internet browser can be passed the requested URL or link along with any relevant cookies, form information or cached information. In another example, the opened window can host an instance of an application executing from an unsecure virtual machine and the requested file can be opened using that unsecure application. Redirection can include redirecting cookies, preferences, usage history, application settings, configurations and/or security tokens. Security tokens may include certificates, credentials, tickets and encryption keys. Thus when a URL or application access request is redirected, a required cookie or security token can be used to access a domain or other web or application content.

The target or redirected virtual machine may provide access to the requested resource (407). As described earlier, such as in connection with FIG. 4A, the target virtual machine may be a secure or unsecure virtual machine depending on the circumstances. The target or redirected virtual machine may provide access to the requested resource responsive to the control virtual machine 232A's redirection. Upon redirecting the request, which may include additional information such as configuration data and security tokens, an application executing in the other virtual machine environment can process the request. Processing the request can include opening a file, downloading a file, modifying a file, mapping to a file structure, mounting a drive, installing an application, executing an application, initiating a connection, establishing a communications stack, or navigating to a site identified by a URL or link.

In some embodiments, the control virtual machine 232A conveys, with the redirection of the request, disk or file structure mounting or mapping information to the target virtual machine. Accordingly, the target virtual machine can be configured to see and access a requested file or application upon redirection of the request. In some embodiments, the methods and systems can be used to redirect file type associations between virtual machines, which may include virtual desktops and other virtual environments. When a URL or file-type-association is redirected, systray icons, shortcuts or other icons may be created or copied to the target virtual machine (e.g., virtual desktop) so that these resources can integrate seamlessly with the original virtual machine. By way of illustration, if a request for WINDOWS MEDIA PLAYER is redirected to an unsecure virtual machine, a shortcut to the unsecure WINDOWS MEDIA PLAYER application can appear in the originating secure virtual machine. When that shortcut is selected, the unsecure virtual machine can execute the unsecure WINDOWS MEDIA PLAYER application within the unsecure virtual machine's environment. In some embodiments, the originating virtual machine loses focus to the target virtual machine, and the originating virtual machine may even be terminated. The target virtual machine receiving focus may satisfy or respond to the request by displaying the requested content or application output. In certain embodiments, the redirection, change in focus to the new virtual machine, and/or display appears seamless and transparent to a user.

In above example, responsive to the selection of the shortcut, the originating secure virtual machine can, in some embodiments, create a window for displaying application output from the unsecure WINDOWS MEDIA PLAYER executing in the unsecure virtual machine. An originating virtual machine can generate or provide a window or region for displaying requested content or application output. In some embodiments, the originating virtual machine designates a region to display the requested content or application output. The control virtual machine 232A may convey or synchronize the location, size and/or shape of the designated region or window to the target virtual machine, for example. In some embodiments, the new virtual machine directs a display of the requested content or application to the originating virtual machine via a virtual ICA connection. In one embodiment, the new virtual machine directs the display through the control virtual machine 232A. In another embodiment, the control virtual machine 232A intercepts the display and redirects the display to the originating virtual machine, or the virtual machine that the control virtual machine 232A places in focus.

As discussed above, in some cases, an unsecure virtual machine may request screen graphics generated by applications executing within a secure virtual machine. Conversely, a secure virtual machine may request screen graphics generated by applications executing within an unsecure virtual machine. Typically each virtual machine may have access to one or more graphics processing units (GPUs), therefore each virtual machine typically has access to most aspects of the GPU(s). In particular, in many cases each virtual machine has read/write access to memory used by the GPU(s) to store rendered images and other graphics data. Thus, one virtual machine may read the graphics generated by another virtual machine by reading from the GPU memory.

In some embodiments, the control virtual machine 232A, control program or hypervisor may provide a graphics manager. The graphics manager may be executed by a trusted dom0 entity. The graphics manager can act as a layer between the virtual machines 232, such that the graphics manager can intercept requests issued to the physical GPU by the virtual machines 232. In some embodiments, the graphics manager assigns graphics memory locations to virtual machines 232 executing on the computing device 201. In other embodiments, the graphics manager segments the GPU memory into one or more secure and unsecure memory sections. In still other embodiments, the graphics manager segments physical memory assigned to the GPU into one or more secure and unsecure memory sections.

The graphics manager may receive a request from a first virtual machine to render graphical data using a graphics processing unit of the computing device. Graphical data may include windows, toolbars, buttons, video, images, or other data. The graphics manager may select and assign a secure section of memory of the graphics processing unit to the first virtual machine. The graphics manager may render graphics from graphical data generated by the first virtual machine to a secure section of the graphics processing unit memory. In some embodiments, the first virtual machine may execute a remote access application, such as an ICA or Remote Desktop Protocol client and may connect to a server and buffer graphical data generated remotely to the secure section of the graphics processing unit memory.

If the graphics manager receives a request or instructions for a second virtual machine to read graphics that are rendered from the first virtual machine graphical data, the graphics manager may direct the second virtual machine to the secure section of the graphics processing unit memory. The graphics manager may determine whether to direct the second virtual machine to the secure section of the graphics processing unit memory based on a determination that the request or instructions are issued by a control virtual machine 232A or dom0 entity, or are otherwise authorized. Accordingly, use of the graphics manager provides one method for redirecting the display of requested content or an application from one virtual machine to another virtual machine.

While the embodiment in FIG. 4B depicts identifying a request to access unsecure information in a secure virtual machine, as apparent from the discussion above, the method can include identifying a request to access secure information in an unsecure virtual machine. In these other embodiments the request can be redirected from an unsecure virtual machine to a secure virtual machine. In addition, various embodiments described above are for illustrative purposes and not intended to be limiting in any way.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for redirecting an access request from one virtual machine to another virtual machine, it will now become apparent to one of skill in the art that other embodiments incorporating the concepts of the invention may be used.

What is claimed:

1. In a computing device executing a hypervisor hosting a secure virtual machine and an unsecure virtual machine, a method for redirecting an access request to the unsecure virtual machine, comprising:
    determining that a virtual machine is requesting access to an unsecure resource, the unsecure resource comprising one of: a file, an application and a uniform resource locator (URL);
    determining, by the control virtual machine, that the request originates from the secure virtual machine executing on the computing device, the secure virtual machine having a different level of access than the unsecure virtual machine to the computing device;
    in response to determining that the request originates from the secure virtual machine, performing the following steps:
        intercepting, by a control virtual machine hosted by a hypervisor executing on a computing device, the request to access the unsecure resource originating from the secure virtual machine;
        establishing, by the secure virtual machine, a secure communications channel between the secure virtual machine and the unsecure virtual machine, the communications channel only accessible by the secure virtual machine and the unsecure virtual machine, and wherein establishing the secure communications channel comprises:
            selecting, by the secure virtual machine, a region in memory to monitor;
            sending, by the secure virtual machine, an interrupt to the unsecure virtual machine indicating a request to communicate with the unsecure virtual machine;
            writing, by the unsecure virtual machine, a predetermined data string to the selected region of memory;
            detecting, by the secure virtual machine, the predetermined data string written by the unsecure virtual machine; and
            in response to detecting the predetermined data string, locking, by the secure virtual machine, the selected region of memory;
        redirecting, by the control virtual machine the request to access the unsecure resource via the secure communications channel between the secure virtual machine and the unsecure virtual machine; and
        accessing, via the unsecure virtual machine, the requested unsecure resource.

2. The method of claim 1, wherein intercepting the request comprises intercepting the request by a control program of the control virtual machine, the control program executing on a processor of the computing device.

3. The method of claim 1, wherein intercepting by the control virtual machine comprises intercepting, by the control virtual machine hosted by a type 1 hypervisor executing on the computing device, the request.

4. The method of claim 1, further comprising initiating, by an application executing on the secure virtual machine, the request for the unsecure resource.

5. The method of claim 1, further comprising determining whether a virtual machine is secure based on one of: an application executing on the virtual machine, an identity of a user accessing the virtual machine, a level of access granted to the virtual machine for accessing one or more resources, and a risk level assigned to the virtual machine.

6. The method of claim 1, further comprising determining whether a requested resource is secure based on one of: file-type association between a requested file and an application, a configuration file of resources, a security setting of the requested resource, an identity of a website corresponding to the requested resource, an identity of a location corresponding to the requested resource, and an identity of a host corresponding to the requested resource.

7. The method of claim 1, wherein redirecting the request further comprises redirecting one of: a cookie and a security token with the request.

8. The method of claim 1, wherein accessing the requested resource comprises one of: downloading a requested file to the unsecure virtual machine, opening a requested file on the unsecure virtual machine, executing a requested application on the unsecure virtual machine, and navigating to a website identified by a requested URL from the unsecure virtual machine.

9. The method of claim 1, wherein accessing the requested resource further comprises displaying the requested resource on the secure virtual machine via a window executing on the unsecure virtual machine.

10. The method of claim 1, wherein accessing the requested resource further comprises displaying the requested resource on the unsecure virtual machine.

11. In a computing device executing a hypervisor hosting a secure virtual machine and an unsecure virtual machine, a system for redirecting an access request to an unsecure virtual machine, comprising:
the hypervisor executing on a computing device and hosting a control virtual machine, the secure virtual machine and the unsecure virtual machine,
wherein the control virtual machine is configured to:
determine that a virtual machine is requesting access to an unsecure resource, the unsecure resource comprising one of: a file, an application and a uniform resource locator (URL);
determine that the request originates from the secure virtual machine executing on the computing device, the secure virtual machine having a different level of access than the unsecure virtual machine to the computing device;
in response to the determination that the request originates from the secure virtual machine, performing the following steps:
intercept the request for access to an unsecure resource originating from the secure virtual machine,
establish a secure communications channel between the secure virtual machine and the unsecure virtual machine, the communications channel only accessible by the secure virtual machine and the unsecure virtual machine, and wherein establishing the secure communications channel comprises:
select a region in memory to monitor;
send an interrupt to the unsecure virtual machine indicating a request to communicate with the unsecure virtual machine;
write a predetermined data string to the selected region of memory;
detect the predetermined data string written by the unsecure virtual machine; and
in response to detecting the predetermined data string, lock the selected region of memory;
redirect the request to access the unsecure resource via the secure communications channel between the secure virtual machine and the unsecure virtual machine, whereupon the unsecure virtual machine provides access to the requested unsecure resource.

12. The system of claim 11, wherein the control virtual machine comprises a control program for intercepting the request, the control program executing on a processor of the computing device.

13. The system of claim 11, wherein the hypervisor comprises a type 1 hypervisor.

14. The system of claim 11, further comprising an application executing on the secure virtual machine, initiating the request for the unsecure resource.

15. The system of claim 11, wherein the control virtual machine identifies a virtual machine as secure or unsecure based on one of: an application executing on the virtual machine, an identity of a user accessing the virtual machine, a level of access granted to the virtual machine for accessing one or more resources, and a risk level assigned to the virtual machine.

16. The system of claim 11, wherein the control virtual machine identifies a requested resource as secure or unsecure based on one of: file-type association between a requested file and an application, a configuration file of resources, a security setting of the requested resource, an identity of a website corresponding to the requested resource, an identity of a location corresponding to the requested resource, and an identity of a host corresponding to the requested resource.

17. The system of claim 11, wherein the control virtual machine further redirects one of: a cookie and a security token with the request.

18. The system of claim 11, wherein the unsecure virtual machine provides access to the requested resource by one of: downloading a requested file to the unsecure virtual machine, opening a requested file on the unsecure virtual machine, executing a requested application on the unsecure virtual machine, and navigating to a website identified by a requested URL from the unsecure virtual machine.

19. The system of claim 11, wherein the secure virtual machine displays the requested resource via a window that executes on the unsecure virtual machine.

20. In a computing device executing a hypervisor hosting a secure virtual machine and an unsecure virtual machine, a method for redirecting an access request to the secure virtual machine, comprising:
determining that a virtual machine is requesting access to a secure resource, the secure resource comprising one of: a file, an application and a uniform resource locator (URL);
determining, by the control virtual machine, that the request originates from the unsecure virtual machine executing on the computing device, the unsecure virtual machine having a different level of access than the secure virtual machine to the computing device;
in response to determining that the request originates from the unsecure virtual machine, performing the following steps:
intercepting, by a control virtual machine hosted by a hypervisor executing on a computing device, the request to access the secure resource originating from the unsecure virtual machine;

establishing, by the secure virtual machine, a secure communications channel between the secure virtual machine and the unsecure virtual machine, the communications channel only accessible by the secure virtual machine and the unsecure virtual machine, and wherein establishing the secure communications channel comprises:
  selecting, by the secure virtual machine, a region in memory to monitor;
  sending, by the secure virtual machine, an interrupt to the unsecure virtual machine indicating a request to communicate with the unsecure virtual machine; and
  writing, by the unsecure virtual machine, a predetermined data string to the selected region of memory;
  detecting, by the secure virtual machine, the predetermined data string written by the unsecure virtual machine; and
  in response to detecting the predetermined data string, locking, by the secure virtual machine, the selected region of memory;
redirecting, by the control virtual machine the request to access the secure resource via the secure communications channel between the secure virtual machine and the unsecure virtual machine; and
accessing, via the secure virtual machine, the requested secure resource.

21. The method of claim 1, further comprising determining whether the virtual machine is secure based on one of: an encrypted disk image, a read-only disk image, an anti-virus program executing on the virtual machine and an active firewall executing on the virtual machine.

\* \* \* \* \*